US012594674B1

(12) United States Patent
Wang et al.

(10) Patent No.: US 12,594,674 B1
(45) Date of Patent: Apr. 7, 2026

(54) MULTI-AGENT CALIBRATION AND MOTION CONTROL

(71) Applicants: UT-Battelle, LLC, Oak Ridge, TN (US); LINCOLN GLOBAL, INC., Cleveland, OH (US)

(72) Inventors: Peter Wang, Oak Ridge, TN (US); Christopher J. Masuo, Knoxville, TN (US); Andrzej Nycz, Knoxville, TN (US); Alexander W. Arbogast, Atlanta, GA (US); Steven D. Patrick, Austin, TX (US); Jonathan H. Paul, Chardon, OH (US)

(73) Assignees: UT-Battelle, LLC, Oak Ridge, TN (US); LINCOLN GLOBAL, INC., Cleveland, OH (US)

( * ) Notice: Subject to any disclaimer, the term of this patent is extended or adjusted under 35 U.S.C. 154(b) by 0 days.

(21) Appl. No.: 19/259,465

(22) Filed: Jul. 3, 2025

(51) Int. Cl.
*B25J 9/16* (2006.01)
(52) U.S. Cl.
CPC ........... *B25J 9/1692* (2013.01); *B25J 9/1684* (2013.01)
(58) Field of Classification Search
CPC .............................. B25J 9/1692; B25J 9/1684
See application file for complete search history.

(56) References Cited

U.S. PATENT DOCUMENTS

| | | | |
|---|---|---|---|
| 11,975,486 B2 | 5/2024 | Zhou et al. | |
| 12,134,230 B2 * | 11/2024 | Sun | B33Y 40/20 |
| 12,214,489 B2 | 2/2025 | Satoh | |
| 12,214,554 B2 | 2/2025 | Cardon | |
| 2005/0273199 A1 | 12/2005 | Ban et al. | |
| 2018/0095450 A1 * | 4/2018 | Lappas | B33Y 10/00 |
| 2022/0134566 A1 | 5/2022 | Holz | |
| 2024/0066708 A1 | 2/2024 | Ingham et al. | |

FOREIGN PATENT DOCUMENTS

| | | |
|---|---|---|
| CN | 109571471 A | 4/2019 |
| CN | 111452048 B | 6/2023 |
| CN | 119238502 A | 1/2025 |
| DE | 102017215268 A1 | 2/2019 |
| WO | 2018069749 A1 | 4/2018 |

OTHER PUBLICATIONS

Arbogast et al.: "Strategies for a Scalable Multi-Robot Large Scale Wire Arc Additive Manufacturing System", Additive Manufacturing Letters 8 (2024).
Li et al.: "Calibration of Multi-Robot Coordinates for Collaborative Wire Arc Additive Manufacturing Using Cross-Source 3D Point Cloud Models", Measurement, vol. 242, Part E, Jan. 2025.

* cited by examiner

*Primary Examiner* — Basil T. Jos
(74) *Attorney, Agent, or Firm* — Fox Rothschild LLP; Carol Thorstad-Forsyth

(57) ABSTRACT

System and methods for calibrating a robotic system. The methods comprise: obtaining point cloud data comprising data points specifying tracked locations of tracking target(s) coupled to robotic arm(s) while the robotic arm(s) draw(s) a three-dimensional object in a space; obtaining reference point cloud data comprising data points defining a reference three-dimensional object; comparing the point cloud data to the reference point cloud data; generating offsets between the three-dimensional object(s) drawn by the robotic arm(s) and the reference three-dimensional object based on said comparing; and kinematically adjusting base frame(s) of the robotic arm(s) using the offsets.

26 Claims, 29 Drawing Sheets

300

700

Offline Tool-path Generation

CAD

STL →

Slicing

GCode →

Gcode Parsing and Database Generation

Part
├ Layer 1
│   ├── Layer Properties
│   ├ Bead 1
│   │      ├── Bead Properties
│   │      ├ Segment 1
│   │      ⋮
│   │      └── Segment N
│   ⋮
│   └─ Bead N
⋮
└── Layer N ↓ Database

Real-time Toolpath Assignments (N times in parallel)

Index Database Layer
↓ Layer
Index Beads of Layer
↓ Bead
Extract Bead Properties

Process Data
- Layer Number
- Part Temperature
- Robot Arm Position Feedback
- Positioner Angle Feedback
- Additional Process Variables Bead Properties →

Calculate Bead Score

Property 1 x Weight 1
+
Property 2 x Weight 2
+
⋮
+
Property Nx Weight N

Aggregate Score →

Ordered List of Best Beads for Robot

↓ Bead List

Robot 1 Task Queue        Robot 1 Task Queue    • • •    Robot N Task Queue

FIG. 7

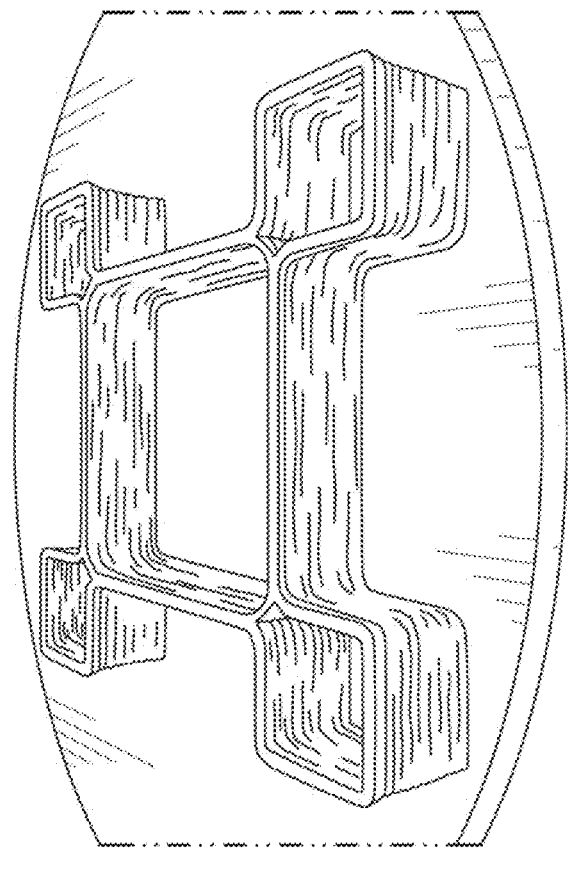
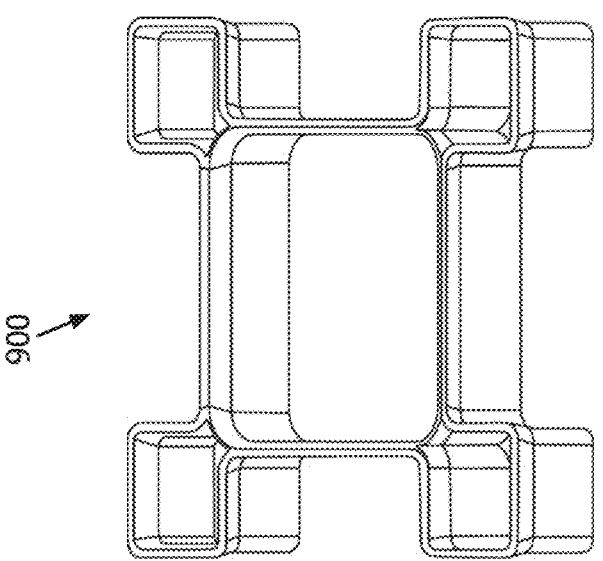
900
FIG. 9

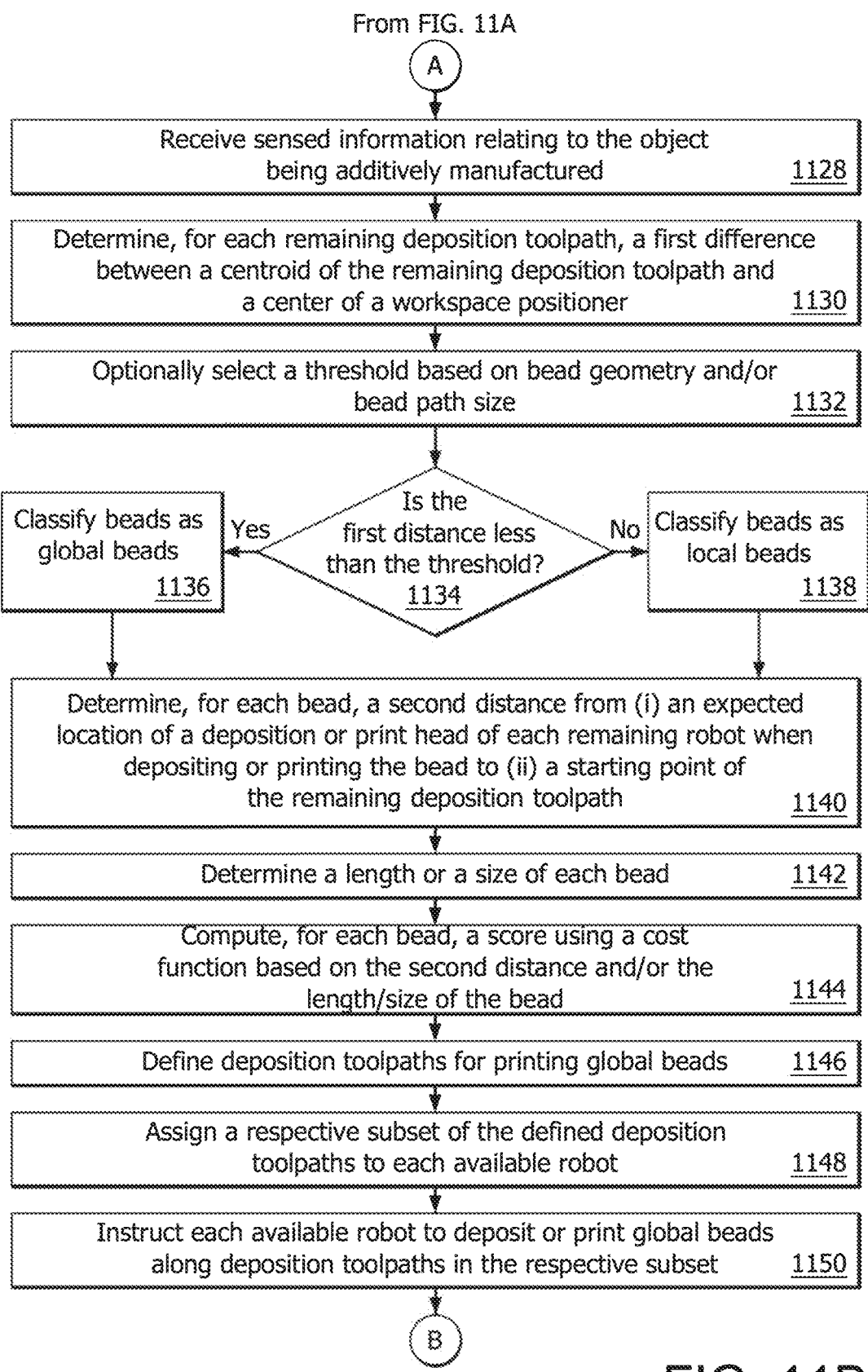

From FIG. 11A (A)

Receive sensed information relating to the object
being additively manufactured    1128

Determine, for each remaining deposition toolpath, a first difference
between a centroid of the remaining deposition toolpath and
a center of a workspace positioner    1130

Optionally select a threshold based on bead geometry and/or
bead path size    1132

Is the
first distance less
than the threshold?
1134

Classify beads as    Yes
global beads
1136

No    Classify beads as
local beads
1138

Determine, for each bead, a second distance from (i) an expected
location of a deposition or print head of each remaining robot when
depositing or printing the bead to (ii) a starting point of
the remaining deposition toolpath    1140

Determine a length or a size of each bead    1142

Compute, for each bead, a score using a cost
function based on the second distance and/or the
length/size of the bead    1144

Define deposition toolpaths for printing global beads    1146

Assign a respective subset of the defined deposition
toolpaths to each available robot    1148

Instruct each available robot to deposit or print global beads
along deposition toolpaths in the respective subset    1150

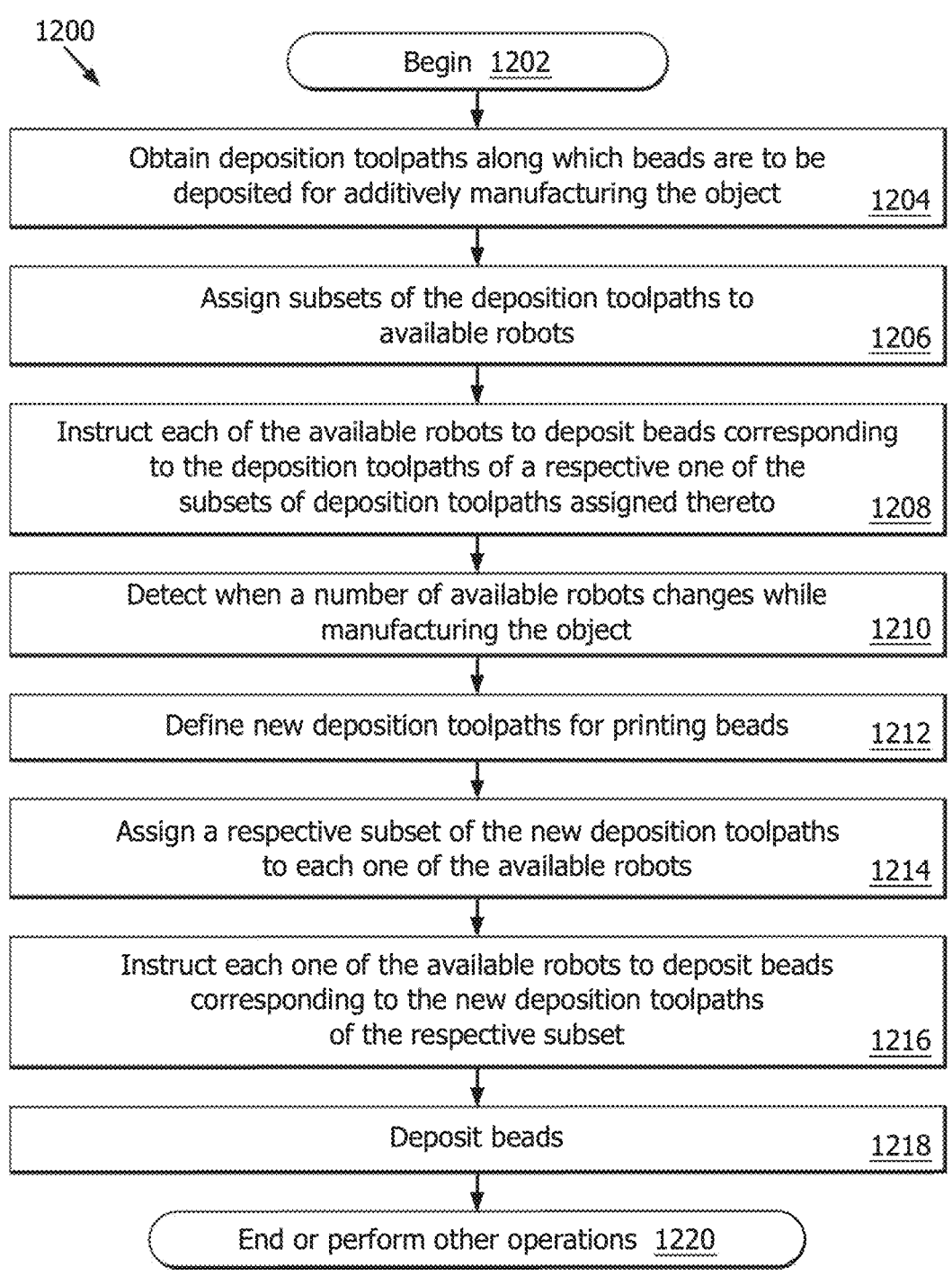

1200

Begin  1202

Obtain deposition toolpaths along which beads are to be
deposited for additively manufacturing the object    1204

Assign subsets of the deposition toolpaths to
available robots    1206

Instruct each of the available robots to deposit beads corresponding
to the deposition toolpaths of a respective one of the
subsets of deposition toolpaths assigned thereto    1208

Detect when a number of available robots changes while
manufacturing the object    1210

Define new deposition toolpaths for printing beads    1212

Assign a respective subset of the new deposition toolpaths
to each one of the available robots    1214

Instruct each one of the available robots to deposit beads
corresponding to the new deposition toolpaths
of the respective subset    1216

Deposit beads    1218

End or perform other operations  1220

FIG. 12

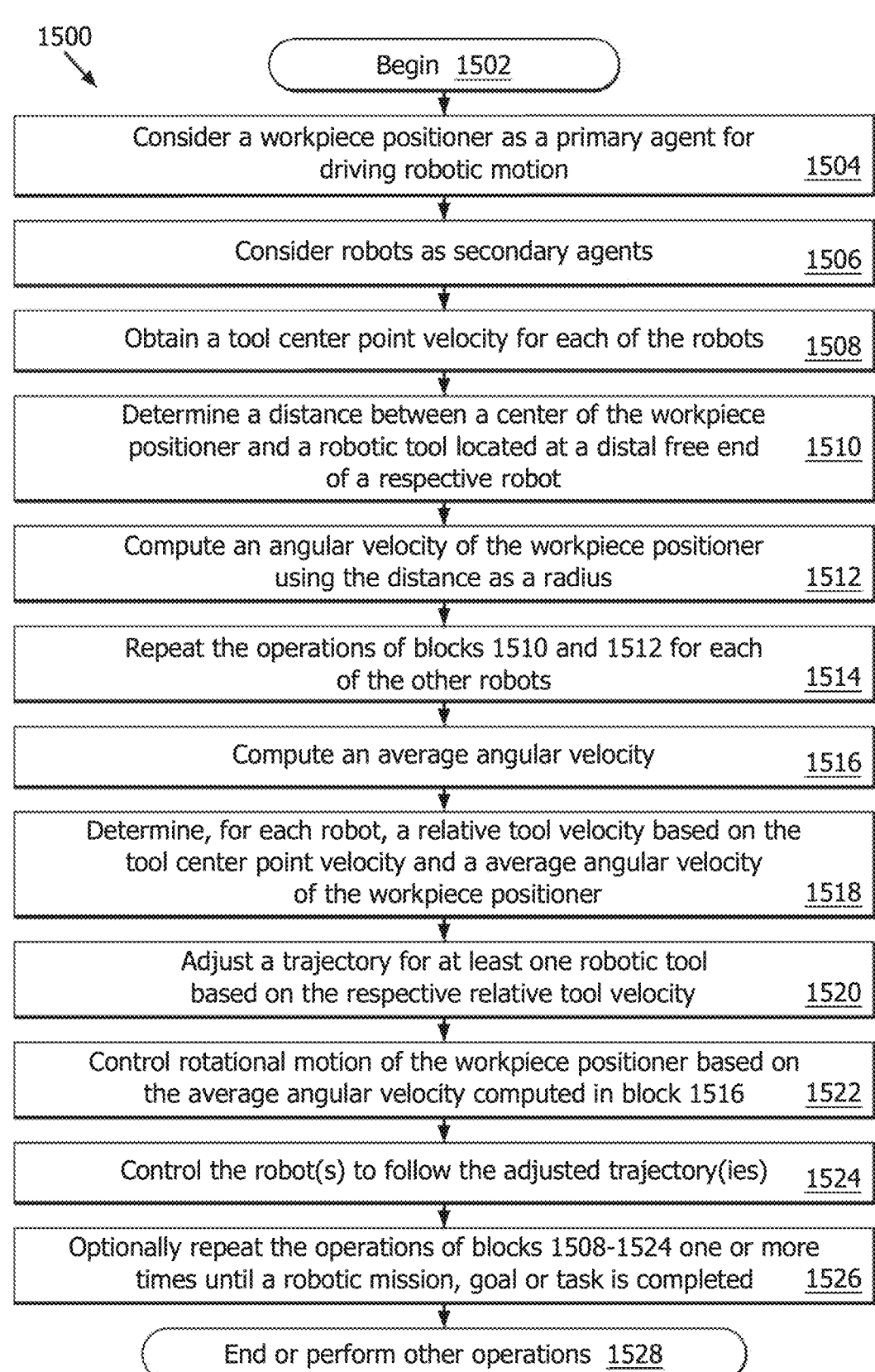

1500

Begin  1502

Consider a workpiece positioner as a primary agent for driving robotic motion     1504

Consider robots as secondary agents     1506

Obtain a tool center point velocity for each of the robots     1508

Determine a distance between a center of the workpiece positioner and a robotic tool located at a distal free end of a respective robot     1510

Compute an angular velocity of the workpiece positioner using the distance as a radius     1512

Repeat the operations of blocks 1510 and 1512 for each of the other robots     1514

Compute an average angular velocity     1516

Determine, for each robot, a relative tool velocity based on the tool center point velocity and a average angular velocity of the workpiece positioner     1518

Adjust a trajectory for at least one robotic tool based on the respective relative tool velocity     1520

Control rotational motion of the workpiece positioner based on the average angular velocity computed in block 1516     1522

Control the robot(s) to follow the adjusted trajectory(ies)     1524

Optionally repeat the operations of blocks 1508-1524 one or more times until a robotic mission, goal or task is completed     1526

End or perform other operations  1528

Begin  2202

Draw a three-dimensional object with a tracking target attached to an arm of a first robot to generate a first set of point cloud data          2204

Draw the three-dimensional object with the tracking target attached to an arm of a second robot to generate a second set of point cloud data          2206

Receive the first set of point cloud data, the second set of point cloud data, and reference point cloud data corresponding to the three-dimensional object          2208

Generate a first set of offsets, based on the first set of point cloud data and the reference point cloud data          2210

Generate a second set of offsets based on the second set of point cloud data and the reference point cloud data          2212

Kinematically adjust a base frame of the first robot via the first set of offsets          2214

Kinematically adjust a base frame of the second robot via the second set of offsets          2216

Repeat operations of blocks 2204 and 2206 to generate an updated first set of point cloud data and an updated second set of point cloud data          2218

Generate an updated first set of offsets based on the updated first set of point cloud data and the reference point cloud data          2220

Generate an updated second set of offsets based on the updated second set of point cloud data and the reference point cloud data          2222

From FIG. 22A

A

Determine a margin of error based on the updated first set of offsets and the updated second set of offsets          2224

Validate a kinematic calibration of said first and second robots based on said margin of error relative to a threshold value          2226

Rotate the positioner with the tracking target affixed thereon to generate a third set of point cloud data          2228

Determine an actual axis of rotation of the positioner based on the third set of point cloud data          2230

Receive a perceived axis of rotation of the positioner from the first or second robot 2232

Generate a third set of offsets based on the actual axis of rotation of the positioner and the perceived axis of rotation of the positioner          2234

Kinematically adjust the perceived axis of rotation of the first or second robot based on the third set of offsets          2236

Sweep the surface of the positioner via the tracking target to generate a fourth set of point cloud data          2238

Determine an actual surface plane of the positioner based on the fourth set of point cloud data          2240

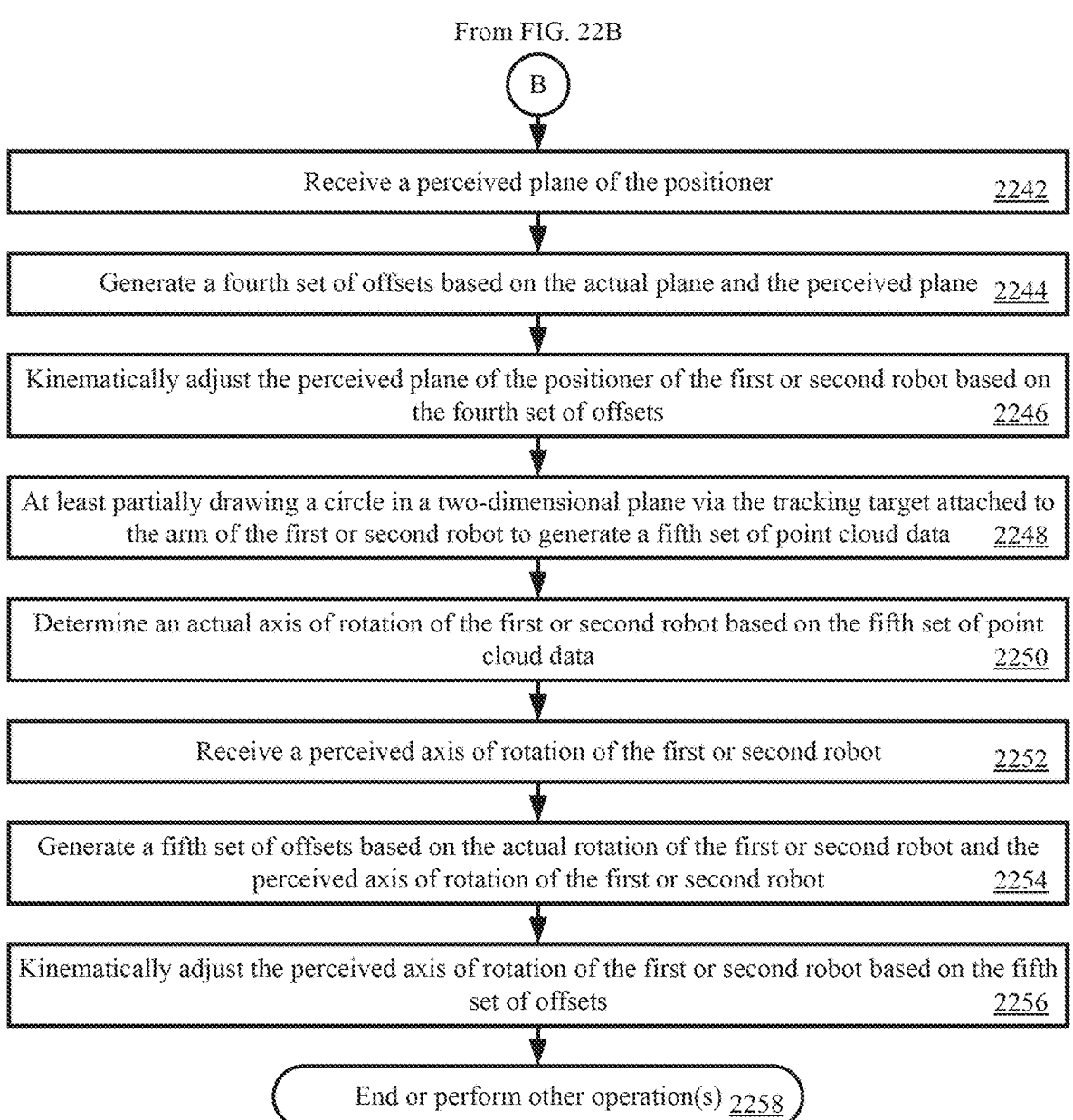

From FIG. 22B

B

Receive a perceived plane of the positioner                                                2242

Generate a fourth set of offsets based on the actual plane and the perceived plane   2244

Kinematically adjust the perceived plane of the positioner of the first or second robot based on the fourth set of offsets                                                            2246

At least partially drawing a circle in a two-dimensional plane via the tracking target attached to the arm of the first or second robot to generate a fifth set of point cloud data     2248

Determine an actual axis of rotation of the first or second robot based on the fifth set of point cloud data                                                                            2250

Receive a perceived axis of rotation of the first or second robot                       2252

Generate a fifth set of offsets based on the actual rotation of the first or second robot and the perceived axis of rotation of the first or second robot                           2254

Kinematically adjust the perceived axis of rotation of the first or second robot based on the fifth set of offsets                                                                        2256

End or perform other operation(s) 2258

FIG. 22C

MULTI-AGENT CALIBRATION AND MOTION CONTROL

STATEMENT REGARDING FEDERALLY SPONSORED RESEARCH AND DEVELOPMENT

The technologies described herein were developed with government support under Contract No. DE-AC05-00OR22725 awarded by the U.S. Department of Energy. The government has certain rights in the described technologies.

BACKGROUND

Description of the Related Art

Robotic wire arc additive manufacturing (WAAM) is a directed energy deposition (DED) technology that has shown significant growth in recent years. This method is capable of manufacturing at high deposition rates, large-scale metal parts on the order of multiple meters in weights of many hundreds of kilograms. This process can print parts with complex geometries, including those with significant overhangs, without the use of support material. This manufacturing technology also allows for in-process control of the material properties through online monitoring and control of thermal conditions and other process attributes. Larger build volumes can be achieved by increasing the size of the robotic arm or gantry system or by moving the part itself. However, this approach expands the print volume without increasing the deposition rate of the system, leading to much longer production times. In addition, any single-robot deposition system contains a single point of failure.

SUMMARY

The present disclosure concerns implementing systems and methods for calibrating a robotic system including at least a first robot and a second robot. The method comprises: (a) drawing a three-dimensional object with a tracking target attached to a distal end of the first robot arm to generate a first set of point cloud data; (b) drawing the three-dimensional object with the tracking target attached to a distal end of the second robot arm to generate a second set of point cloud data; (c) receiving the first set of point cloud data, the second set of point cloud data, and reference point cloud data corresponding to the three-dimensional object; (d) generating a first set of offsets, based on the first set of point cloud data and the reference point cloud data; (e) generating a second set of offsets based on the second set of point cloud data and the reference point cloud data; (f) kinematically adjusting a base frame of the first robot via the first set of offsets; and (g) kinematically adjusting a base frame of the second robot via the second set of offsets.

The present disclosure also concerns implementing systems and methods for calibrating a robotic system. The methods comprise: obtaining, by a processor, (1) first point cloud data comprising data points specifying tracked locations of a first tracking target coupled to a first robotic arm while the first robotic arm draws a three-dimensional object in a space, and (2) reference point cloud data comprising data points defining a reference three-dimensional object; comparing, by the processor, the first point cloud data to the reference point cloud data; generating, by the processor, first offsets between the three-dimensional object drawn by the first robotic arm and the reference three-dimensional object based on said comparing; and kinematically adjusting a base frame of the first robot using the first offsets.

The present disclosure further concerns a system for calibrating a robotic system. The system comprises: a processor; and a non-transitory computer readable medium comprising one or more programming instructions that when executed by the processor, cause the processor to: obtain (1) first point cloud data comprising data points specifying tracked locations of a first tracking target coupled to a first robotic arm while the first robotic arm draws a three-dimensional object in a space, and (2) reference point cloud data comprising data points defining a reference three-dimensional object; compare the first point cloud data to the reference point cloud data; generate first offsets between the three-dimensional object drawn by the first robotic arm and the reference three-dimensional object based on said comparing; and kinematically adjust a base frame of the first robot using the first offsets.

BRIEF DESCRIPTION OF THE DRAWINGS

The present solution will be described with reference to the following drawing figures, in which like numerals represent like items throughout the figures.

FIG. 7 provides an illustration showing an example machine intelligence algorithm configured to assign deposition toolpaths.

FIG. 9 provides an example illustration showing a build that was prepared to test the asynchronous coordinated motion capabilities and machine intelligence of the system.

FIGS. 11A-11C (collectively referred to as "FIG. 11") provides a flow diagram of an illustrative method for controlling robots to perform additive manufacturing to produce an object.

FIG. 12 provides a flow diagram of an illustrative method for controlling robots to perform additive manufacturing to produce an object.

FIG. 15 provides a flow diagram of an illustrative method for controlling motion of robots in a coordinated manner during an additive manufacturing process.

FIG. 21, FIGS. 22A-22C (collectively referred to as "FIG. 22"), and FIG. 23 each provides a flow diagram of another illustrative method for calibrating a multi-robot system.

DETAILED DESCRIPTION

Figure 1:
FIG. 1 provides an illustration of an example toolpath that is configured to run line-by-line in accordance with a generated g-code.

Conventional methods of assigning toolpaths for a CNC machine or 3D printer requires the use of computer-aided manufacturing (CAM) or a slicer to create predefined toolpaths and then execute each path line-by-line, as shown in FIG. 1. This does not consider any boundary conditions that the machine or printer and manufactured part encounters during a manufacturing process, thus potentially reducing quality and lowering productivity. Preplanning the toolpaths is a conventional method for resolving these issues. However, this may require high confidence in a model simulation to predict the exact state of the machine or printer and the part during offline execution of the manufacturing process to ensure no defects occur. Additionally, there is no effective method for assigning toolpaths for a multi-agent system, in which the multi-agents collaborate to manufacture the same part.

The present solution concerns implementing systems and methods for adaptively and dynamically assigning toolpaths for a multi-agent system composed of agents with dynamic behaviors with offline strategies. The agents can include, but are not limited to, articulated robots or robots with articulated arms. The present solution implements machine intelligence to dynamically handle toolpath assignments to each agent during a manufacturing process. This utilizes full feedback from each individual agent and the produced part by incorporating sensors (e.g., thermal cameras, 3D scanners, force sensors, etc.) into the CAM system. Furthermore, preprocessed toolpath generation can still be incorporated to assist in the toolpath assignment. The disclosed dynamic toolpath assignment can use a cost function to rank each individual toolpath.

Figure 2:
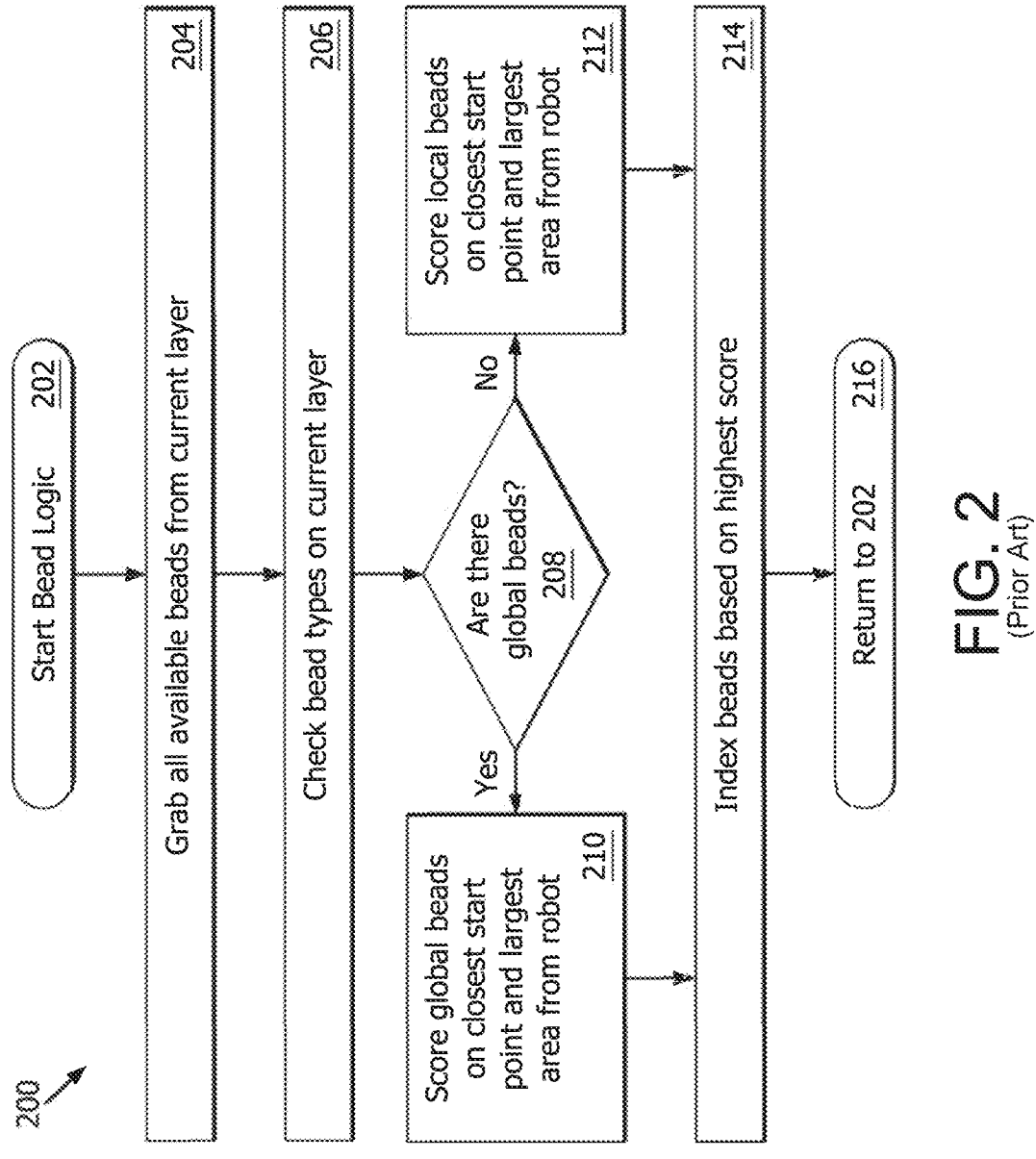
FIG. 2 provides an example flowchart that is useful for understanding a first portion of a toolpath assignment strategy for a multi-robot coordinated-motion deposition system.

FIG. 2 provides a flow diagram of a method 200 illustrating the first portion of the disclosed toolpath assignment strategy for a multi-robot coordinated-motion deposition system. Method 200 involves the operations of blocks 202-216. These operations generally involve: starting bead logic for producing an object via a multi-layer build using CAM; grabbing or identifying all beads in a current layer of the multi-layer build; checking bead types in the current layer; determining whether there are global beads (e.g., beads that can be performed by multiple available robots) in the current layer; scoring the global beads based on a closest start point and a largest area from a robot and/or scoring local beads (e.g., beads that can be performed only by one robot) in the current layer based on a closest start point and a largest area from the robot; indexing the beads in the current layer based on a highest score; and returning to the first operation to repeat the assignment process on subsequent layers.

Figure 3:
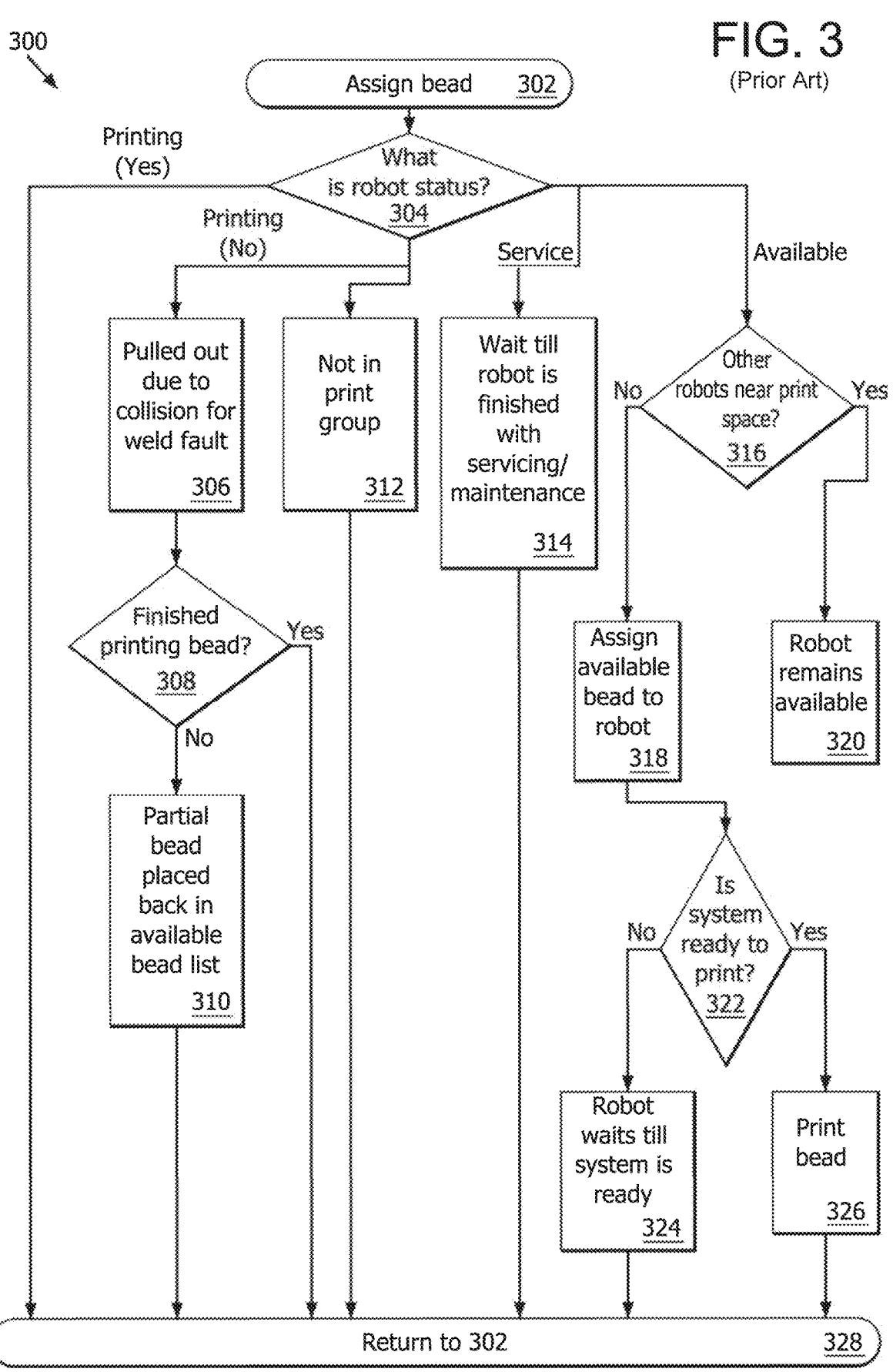
FIG. 3 provides an example flow diagram that is useful for understanding a high-level framework of the dynamic toolpath assignment to be used in a multi-robot coordinated motion deposition system.

Afterwards, the assigned toolpaths are sent to the available and best matched agents or robots. FIG. 3 provides a flow diagram of method 300 illustrating a second portion of the disclosed toolpath assignment to be used in a multi-robot coordinated-motion deposition system, for instance. Method 300 involves operations of blocks 302-328. These operations involve: assigning a bead to a robot; determining a robot's status; and performing operations based on the robot's status. For example, if the robot is currently printing a bead, then the process returns to block 302 where the bead is (re) assigned to another robot. If the robot has nearly collided with another robot while printing the bead as shown by block 306, then the system determines whether the bead has been fully or partially printed in block 308. If the bead has been fully printed [308:YES], then the system returns to block 302 so that the next bead can be assigned to a robot. In contrast, if the bead has been partially printed [308:NO], then the system places the bead back in the available bead list so that it can be reassigned in the next iteration of the process. If the robot is not in the print group of robots as shown by block 312, then the system returns to 302 so that the bead can be assigned to another robot in the print group. If the robot is being serviced, then the system waits until the robot is finished being serviced and/or maintenance of the robot is completed as shown by block 314. In some embodiments, the system may assign the bead to another robot if the robot is being serviced and/or maintained. If the robot is available to print, then the system determines whether other robots are near this robot's workspace or print space. If so [316:YES], then the robot remains available but method 300 returns to 302 so that assignment of the bead to a robot can start over or otherwise be re-performed. If not [316:NO], then the bead is assigned to the robot. The robot either prints the bead or waits to print the bead until the system is ready for printing, as shown by blocks 324 and 326. Thereafter, method 300 is repeated for the assignment of the next bead.

The present solution simplifies the task allocation process for each agent compared to a preprocessed solution, as the disclosed techniques adapt to the main system's environment in real-time. This also reduces the time wasted in running rigorous simulations to ensure each agent does not interfere with other agents during the manufacturing process. The present solution enables increased productivity, increased system deposition rate (i.e., the total amount of weld metal deposited by the system over a period of time), increased reliability, and system scaling. The present solution can be used generally in fields such as manufacturing. More specifically, the present solution can be used for large scale manufacturing and/or additive manufacturing.

The present solution is configured to improve (i) the printing process' efficiency and reliability, and (ii) build volume of single-robot large-scale metal additive systems through the development of the disclosed multi-robot and machine intelligence technologies. Expanding the build volume while reducing production time necessitates higher system deposition rates which can be achieved by increasing the number of deposition agents. This also avoids single point of failure inherent in single-robot systems, making it more reliable. Using two or more agents leads to additional uncertainties due to individual agents potentially encountering faults or being preoccupied with other tasks. Synchronizing these agents requires full availability, which results in an extended production time. Moreover, an increased number of agents raises the likelihood of collisions. Pre-processed motion planning becomes impractical as it would need to account for collisions and indeterministic faults of an agent. This necessitates the capability of dynamically creating and assigning atomic asynchronous deposition sub-tasks to each deposition agent. To ensure that the task assignment is efficient, and build quality is maintained, these tasks should be executed by any of the deposition heads in an order that optimizes the productivity, reliability, thermal management, or other specified functions. The present system can be configured such that each build could be executed by any combination of agents, and deposition tasks should be able to be reassigned on the fly. These criteria require motion control techniques that can manage the collaborative build process for a multi-robot system.

Figure 4A:
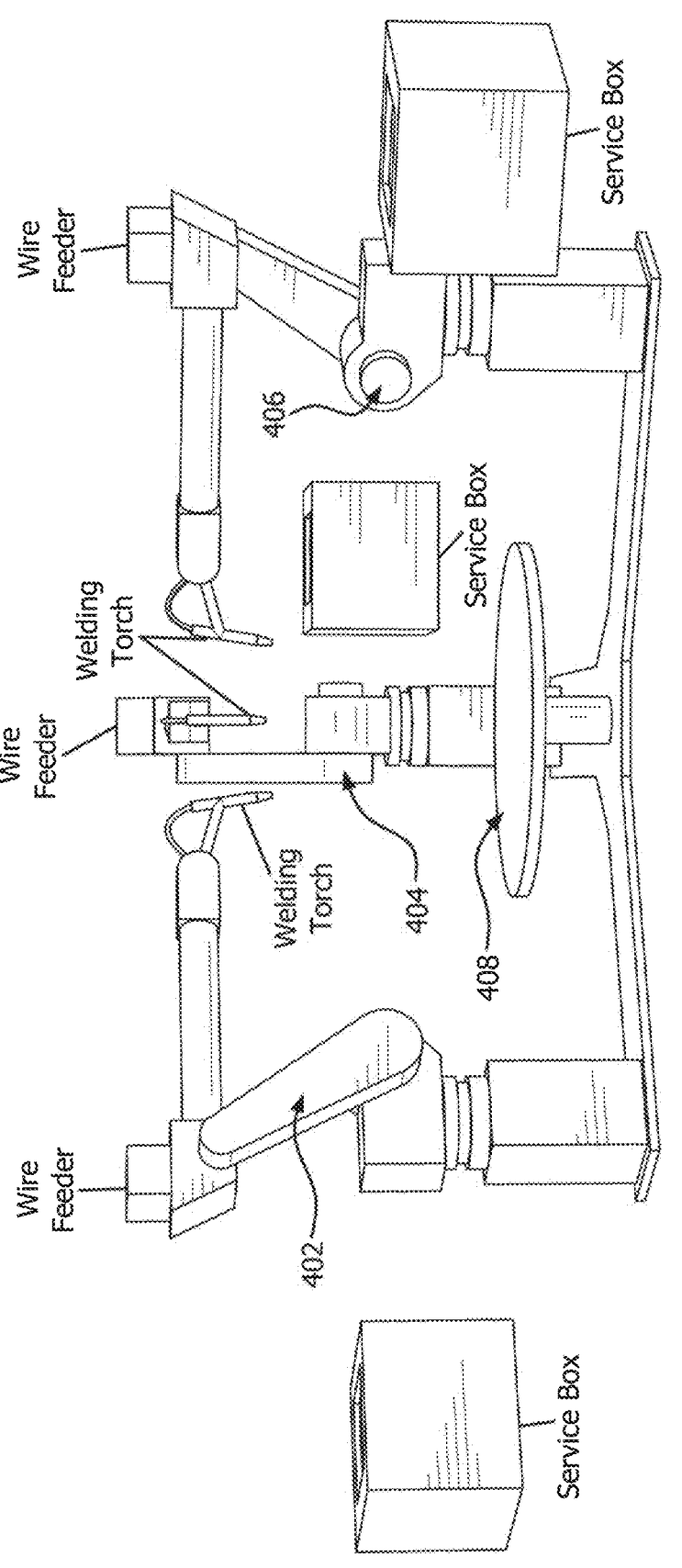
FIGS. 4A-4B (collectively referred to herein as "FIG. 4) provide illustrations showing an example robotic system implementing the present solution.
Figure 4B:
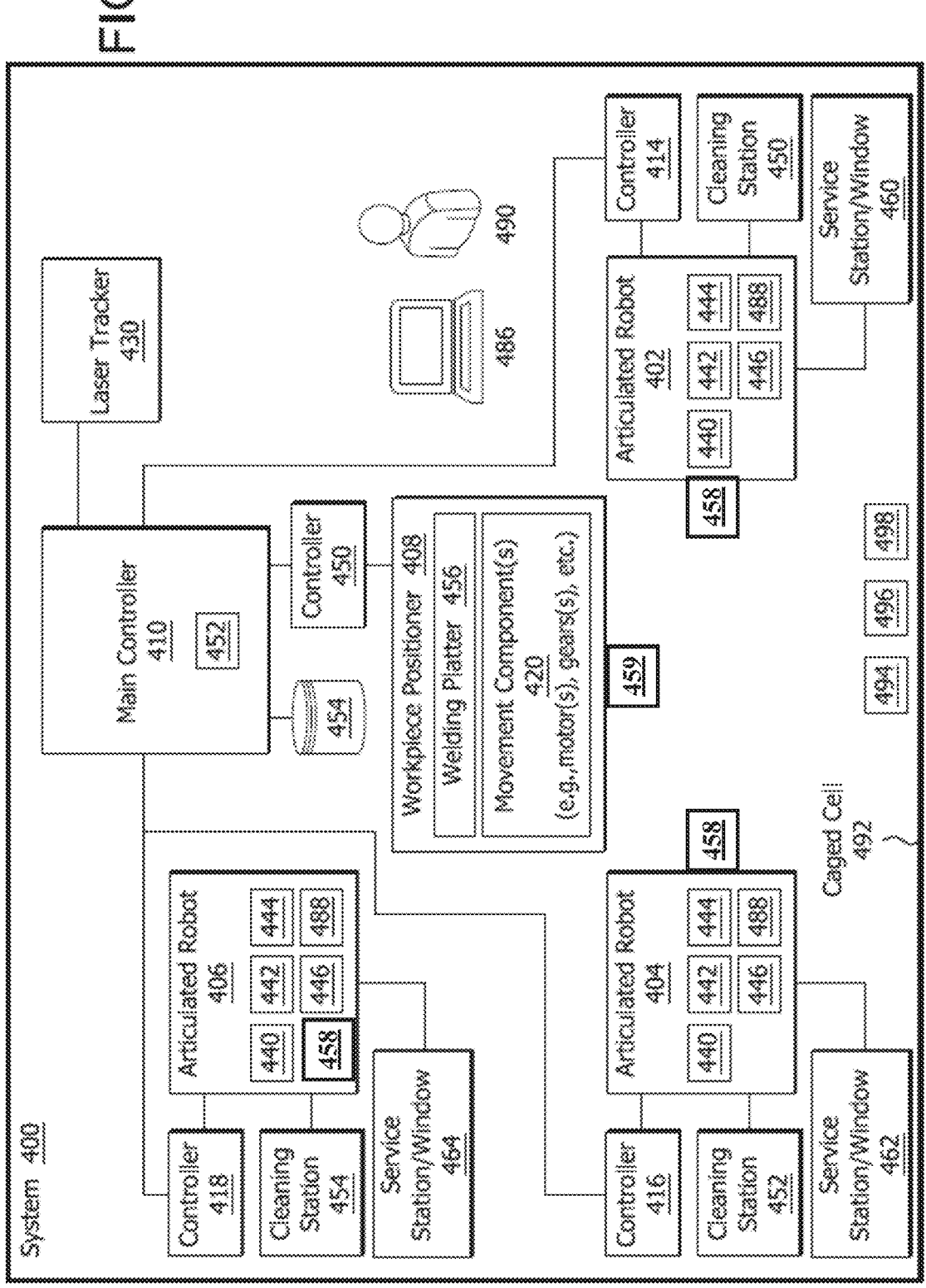

FIGS. 4A-4B provides illustrations showing a non-limiting example of a system 400 implementing the present solution. System 400 is generally configured to perform bead deposition additive manufacturing processes to make products by depositing material from machine heads onto substrates. The deposited material may be in the form of beads. The deposited material can include, but is not limited to, metal materials.

System 400 comprises a multi-robot coordinated-motion deposition system. Three articulated robots 402, 404, 406 are shown in FIG. 4A. The present solution is not limited in this regard. Any number of robots can be provided in accordance with a given application. Each of the articulated robots 402, 404, 406 can include, but is not limited to, an ABB IRB 4600 robot comprising an articulated arm. The number of robots and their kinematic arrangement may be chosen, for example, with technologies including machine intelligence required for dynamic print-path assignment and control. The disclosed architecture is modular and extensible to any number of robots in any kinematic arrangement by utilizing a decentralized controller 414, 416 or 418 for each robot and a main controller 410 to manage task assignment and motion planning of the articulated robots.

Figure 5:
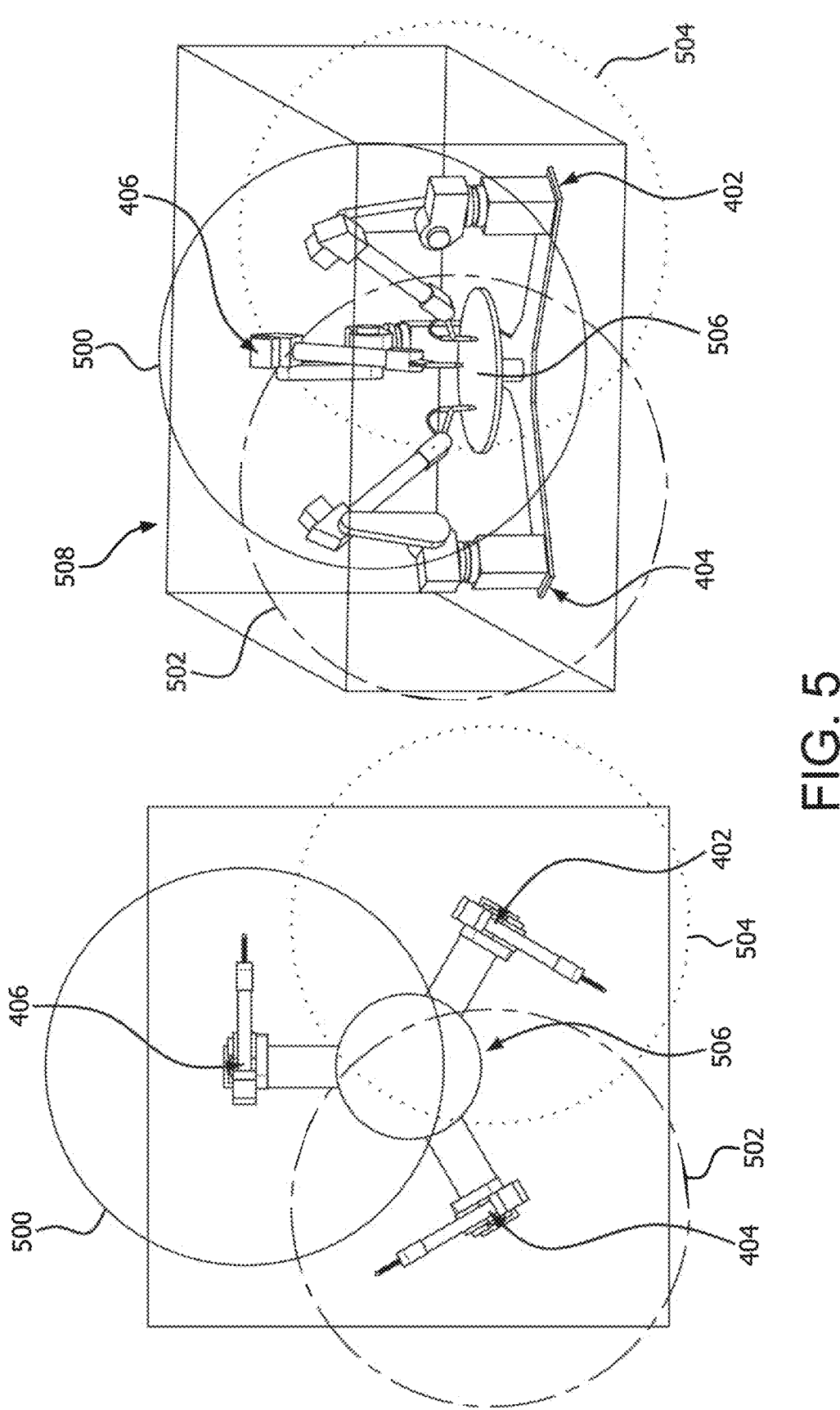
FIG. 5 provides illustrations showing a workspace of a three-robot coordinated-motion deposition system where the shapes represent the workspace of the robots, and the bounding box represents a caged cell. The illustration on the left of FIG. 5 provides a top view of the workspace, while the illustration on the right of FIG. 5 provides a perspective view of the workspace.

Each articulated robot 402, 404, 406 has multiple degrees of freedom, for example, six-degrees of freedom. In the embodiment shown, the articulated robots 402, 404, 406 are spaced around a workpiece positioner 408. It should be appreciated that the various inventions disclosed herein may apply to other arrangements, e.g., robots placed adjacent to each other along an assembly line, robots positioned on opposing sides of an assembly line, etc. In this example, as shown in FIG. 5, each robot has a workspace 500, 502, 504 associated therewith which defines a 3D area in which it can print beads in a layer-by-layer manner during an additive manufacturing process. The articulated robots are arranged such that their workspaces 500, 502, 504 at least partially overlap to define a common workspace 506. The robots 402-408 are controlled by controller(s) 414, 416, 418. The robot controller(s) 414, 416, 418 can include, but is(are) not limited to, an industrial robot controller having a product number of ABB IRC5.

The workpiece positioner robot 408 may include a circular welding platen 456 with its motion driven by movement component(s) 420 such as motor(s) and/or gear(s). The motor(s) can include, for example, a motor unit or gear unit package. The circular welding platen 456 may, for example, measure 2.25 meters in diameter. The cylindrical build envelope of the system may total to 7.95 m³. However, a larger volume shown in FIG. 5 is attainable should a build extend past the cylindrical envelope of the workpiece positioner 408.

A laser tracker 430 may be provided to record robot paths and capture the geometry of the workpiece positioner 408. The laser tracker 430 may include, but is not limited to, an absolute laser tracker with 3D metrology software. The laser tracker 430 may also be used to calibrate the coordinate frame locations of each articulated robot 402-406. In some scenarios, the final positional error between each articulated robot's end effector may be less than 0.07 mm for points in system's global coordinate frame. A tracking target 458, 459 may be provided with each robot 402, 404, 406 and/or workpiece positioner 408 to assist the laser tracker 430 with ascertaining a current state of the same. Each tracking target 458 may be mounted on an end of the articulating robotic arm of a respective robot. Tacking target 459 may be mounted on a top surface of the workpiece positioner 408. Each tracking target 458 may comprise, for example, a reflector. The reflector can include, but is not limited to, a colored ring reflector. The manner in which the robots and/or workpiece positioner 408 are calibrated using the laser tracker 430 and tracking targets 458 will become evident as the discussion progresses.

Each articulated robot 402, 404, 406 may be equipped with bead printing elements at its distal end. The bead printing elements can include, but are not limited to, heating element(s) 440 and/or wire feeder(s) 442. The heating elements 440 can include, but are not limited to, welding torch(es). The welding torch(es) may include, but is(are) not limited to, metal inert gas (MIG) welding torch(es). The welding torch(es) may be powered by a power source 444. Each power source 444 can include, but is not limited to, CV or CC/CV power sources (e.g., Lincoln Electric Power Wave R450s with Power Wave STT modules). The wire feeder(s) 442 may include, but are not limited to, four roll wire feeders.

Shielding gas is supplied to each welding torch via a gas manifold 446 designed to control gas mixtures and regulate pressure and flow rate. To minimize system downtime due to spatter buildup on the nozzles and contact tips of the gas manifold 446, a cleaning station 450, 452, 454 is provided to periodically trim the welding wire and clean the nozzle of the welding torch(es). Each cleaning station 450, 452, 454 can include, but is not limited to, any suitable known torch cleaning station for MIG welding torches.

Each articulated robot 402, 404, 406 is also equipped with a service window 460, 462, 464 that enables an operator 490 to perform periodic maintenance procedures from outside of the workspace without affecting the build process for the other articulated robots.

The system may be enclosed with a caged cell 492. The caged cell 492 may be covered with welding curtains and may feature a retractable ceiling to allow crane access for removing large parts. The caged cell 492 may be equipped with a filtration system 494 to expel weld fumes, and entrances to the caged cell 492 may be protected with safety sensors 496. The filtration system 494 can include, but is not limited to, a welding fume extraction unit with a fixed mechanical filter. The safety sensors 496 can include, but are not limited to, non-contact safety sensors.

A computing device 486 may be provided to allow operator 490 to monitor the robotic process, view analytics, view sensor data, and/or perform user-software interactions for controlling one or more components of system 400. The sensor data can include, but is not limited to, images captured by cameras. Cameras 498 may be mounted on the ceiling of caged cell 492. The cameras 498 can include, but are not limited to, three pan-tilt zoom network cameras. Cameras 488 may also be mounted on each deposition arm to monitor the process during operation. These cameras 488 can include, but are not limited to, Gigabit Ethernet cameras.

In some scenarios, the controller(s) 410, 414, 416, and 418 may comprise centralized or distributed controller circuitry. The controller circuitry may be configured to communicate with robots. The robots may be positioned adjacent to one another such that their workspaces overlap to define a common workspace. The robots may be configured to additively manufacture, within the common workspace, an object on a-layer-by-layer basis by depositing, for each layer of the object, beads along paths associated with the layer. The controller circuitry may also be configured to: obtain paths along which beads are to be deposited for additively manufacturing the object; monitor which of the robots are available for depositing the beads; assign respective subsets of the paths to the available robots to optimize collaboration among the available robots as they additively manufacture the object within the common workspace; instruct each available robot to deposit beads corresponding to paths of its assigned subset; detect that a different number of robots is currently available for depositing the beads while there are remaining paths along which to deposit beads for completing the additive manufacture of the object; assign respective new subsets of the remaining paths to the currently available robots to optimize collaboration among the currently available robots as they continue to additively manufacture the object within the common workspace; and instruct each available robot to deposit beads corresponding to paths of its assigned new subset.

The controller circuitry may also be configured to: receive, from the robots, respective state information indicative of a robot being one of idle, active, in service, or off; monitor each robots availability; detect changes in each robots availability based at least in part on the robot's state information; communicate with one or more sensors arranged to collect process information relating to the object being additively manufactured within the common workspace; produce respective aggregate scores of the paths based at least in part on the process information; and assign to each available robot a subset of paths based on their corresponding aggregate scores.

The controller circuitry may be further configured to: determine whether a path is global or local; and produce an aggregate score for the path further based on the path being global or local. The aggregate score of the path may be computed as described in relation to FIG. 2.

The controller circuitry may also be configured to: instruct each available robot to deposit beads corresponding to paths of its assigned subset by transmitting an associated task queue to the available robot; assign to each available robot a subset of paths as described in relation to FIG. 3; communicate with a data store that stores the paths along which beads are to be deposited for additively manufacturing the object; and obtain the paths by accessing the data store.

Figure 6:
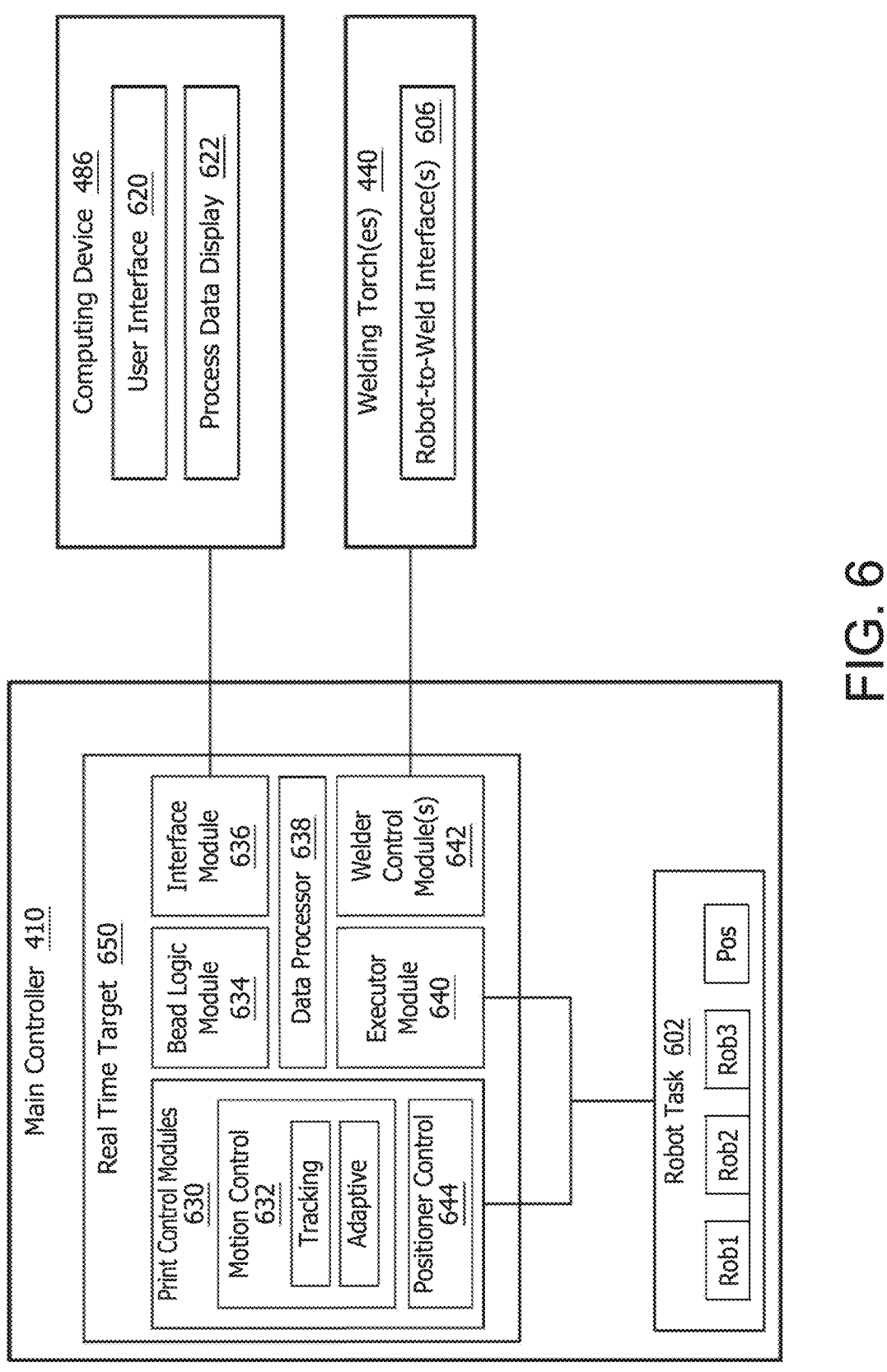
FIG. 6 provides an illustration of an example hardware and software architecture for the system shown in FIG. 4.

FIG. 6 provides an illustration of a hardware and software architecture for system 400. The main controller 410 is configured to schedule robot tasks 602 and communicate control signals to a real time target 650 for controlling the robots to perform their respective tasks, communicate control signal to the welding torch(es) 440 for controlling operations thereof, and/or receiving information from the welding torch(es) 440. The welding torch(es) 440 may include robot-to-weld interface(s) 606 to facilitate communications with the real-time target 650. The real-time target 650 may be configured with print control module(s) 630, a bead logic module 634, an interface module 636, a data processor 638, an executor module 640, and a welder control module 642. Print control module(s) 630 comprise(s) motion control 632 (tracking and/or adaptive) and positioner control 644. The real-time target 650 may comprise controller 414, 416 418 and/or 450 of FIG. 4.

External motion control begins when an articulated robot 402, 404, 406 is assigned a deposition task. The external motion control modules 632 continue to control the asynchronous coordinated motion of each robot until a deposition task is complete. Through arc seam tracking (TAST) and adaptive height control modules process the motion and welder feedback data and alter the original toolpaths to adjust for process disturbances. The bead logic and print control modules 634 continue to assign and control deposition tasks in parallel for each robot until the build is complete.

System 400 requires coordinated motion for each articulated robot 402, 404, 406 to follow deposition toolpath coordinates specified in the workpiece positioner's moving reference frame. The coordinated motion must also be asynchronous to allow each articulated robot 402, 404, 406 to enter and exit coordination with the workpiece positioner 408 at any given time. An externally guided motion (EGM) interface may be used to provide an interface by which the real-time target 650 of the main controller 410 can bypass the motion planning of the robot controller(s) 414, 416, 418 and perform the necessary controls to achieve asynchronous coordinated motion. The external motion control and communication for each articulated robot 402, 404, 406 and the workpiece positioner 408 is performed in the print control module 630 of the real-time target 650. EGM uses protocol buffers to serialize motion control messages. Communication is performed via a plurality of user datagram protocol (UDP) streams between the real-time target 650 and the robot controller(s) 414, 416, 418. The robot motion control module(s) 632 use(s) the workpiece positioner's angle to transform toolpath coordinates and adjust the robot's cartesian velocity to follow the deposition trajectory in the workpiece positioner's moving reference frame. The cartesian velocity may be defined by the following mathematical equation (1).

$$\vec{V}_R = -\vec{V}_P + \vec{V}_D + \vec{V}_E \qquad (1)$$

where $\vec{V}_R$ is the commanded Cartesian velocity vector for the tool of a robot, $\vec{V}_P$ is the tangential velocity vector of the robot tool caused by the rotation of the workpiece positioner, $\vec{V}_P$ is the tool traversal velocity required for deposition, and $\vec{V}_E$ is the error correction velocity vector. Each vector is expressed in a stationary reference frame in which Cartesian velocities can be commanded via EGM. The workpiece positioner's tangential velocity $\vec{V}_P$ is negative to correct for the relative velocity in the positioner frame. The deposition velocity $\vec{V}_D$ is the nominal deposition velocity with correction from the adaptive height control. The error correction velocity $\vec{V}_E$ uses proportional control to maintain the trajectory by using the error between distance of the planned trajectory and the current position of the robot. The gain is tuned by running multiple toolpaths for each robot.

The positioner motion control module 644 utilizes current robot positions and deposition velocity vectors to adjust the angular velocity of the workpiece positioner 408. The angular velocity may be defined by the following mathematical equation (2).

$$\dot{\theta} = \frac{\vec{r} \times \vec{V}_D}{r^2} \qquad (2)$$

where $\dot{\theta}$ is the angular velocity, $\vec{r}$ is the radius vector, and r is the scalar radius. The radius is the Euclidean distance of the distal end of the robot with respect to the center of the workpiece positioner 408. When multiple robots are coordinating with the workpiece positioner 408, the average angular velocity may be used.

In some implementations, the control software may be written in, for example, a graphical programming environment. The control software may be deployed on a real-time target running, for example, a real-time operating system (RTOS). The real-time system may communicate with the controller via four 250 Hz user datagram protocol (UDP) communication streams and a single 10 Hz transmission control protocol (TCP) stream. A user interface (UI) may run on a desktop host computer that communicates to the real-time target via a 10 Hz TCP stream. Each welder may communicate with the real-time target at 100 Hz through a digital communication system and to the controller via a network protocol. The present solution is not limited to the particulars of these implementations.

To fabricate a metal additive part, a CAD model of that part may be exported as an STL file. The CAD model may be sliced into a plurality of layers and processed into a G-Code file with offline toolpath-generation software. The G-Code file may be loaded into a robot programming software that parses the toolpath coordinates into a database file (e.g., JavaScript Object Notation (JSON)) and assigns properties to each layer, bead, and bead segment. The database file format avoids syntactic dissimilarities between different supported G-Code flavors and provides a neutral language by which a computing device or processor can understand instructions from any toolpath generation software.

From the user interface 620 of the computing device 486, the operator 490 may choose build parameters and transfer a database file to the real-time target 650. Parallel modules running on the real-time target 650 establish the necessary communications with their designated hardware. The interface module 636 connects with computing device 486. Executor module 640 connects to the main controller 410. Each welder control module 642 begins communicating with a respective welding torch 440. When all necessary communication streams have been established, the bead logic module 634 loads layers from the database file in memory and distributes atomic deposition tasks among the available articulated robots 402, 404, 406.

The print control module 630 manages the states of a respective articulated robot 402, 404 or 406 via the executor module 640. The executor module 640 communicates with the main controller 410 to send the articulated robots 402, 404, 406 to the service station and/or windows 460, 462, 464 when necessary and opens the external motion control interfaces between the real-time target 650 and the robot controllers 414, 416, 418. The bead logic module 634 and print control modules 630 continue to assign and control deposition tasks in parallel for each articulated robot 402, 404, 406 until the build is complete.

System 400 may employ a machine intelligence algorithm 700 to assign deposition toolpaths. One illustrative machine intelligence algorithm is shown in FIG. 7. The machine intelligence algorithm 700 uses a scoring system to intelligently rank each deposition toolpath in a layer. The properties assigned to layers, beads, and bead segments when creating the database file (e.g., a JSON database file) are used by the bead logic module 634 to determine the remaining deposition toolpaths and provide attributes to the scoring system by which the beads can be scored and/or ranked. The scoring system uses the database properties, real-time system feedback, and the current system states to fill a queue for each printing robot 402, 404, 406 with atomic deposition toolpaths that best satisfy a series of weighted qualifications. The modularity of the bead scoring system allows for a limitless combination of parameters and weights that can be adjusted to reflect the relative criticality of the production criteria for the system or specific build. In some embodiments, the disclosed bead scoring system relies on the distance between the deposition toolpath (e.g., a centroid) and a reference point, for example, the center of the workspace positioner 804 and/or the distance between the deposition or print head (e.g., a torch) to the deposition toolpath (e.g., a starting point or ending point thereof). Shorter distances between the deposition or print head of an articulated robot and the toolpath start point are scored higher. This prevents overextending the articulated arm of a robot across regions of the build volume that could increase the chance of collisions between the articulated robots. The chosen parameters are suitable for geometries with a small cross-section aspect ratio. These geometries generate contour toolpaths that are centered to the positioner, allowing the workpiece positioner 408 to rotate at a consistent velocity. This outcome prioritizes positioner movement and demonstrates the coordinated motion between the articulated robots 402, 404, 406 and the workpiece positioner 408. Although it should be understood that the bead scoring system may be take on other forms. For instance, in one embodiment, a score may be determined based on a position or distance between print heads (e.g., welding torches) of respective robots and a deposition toolpath.

Figure 8:
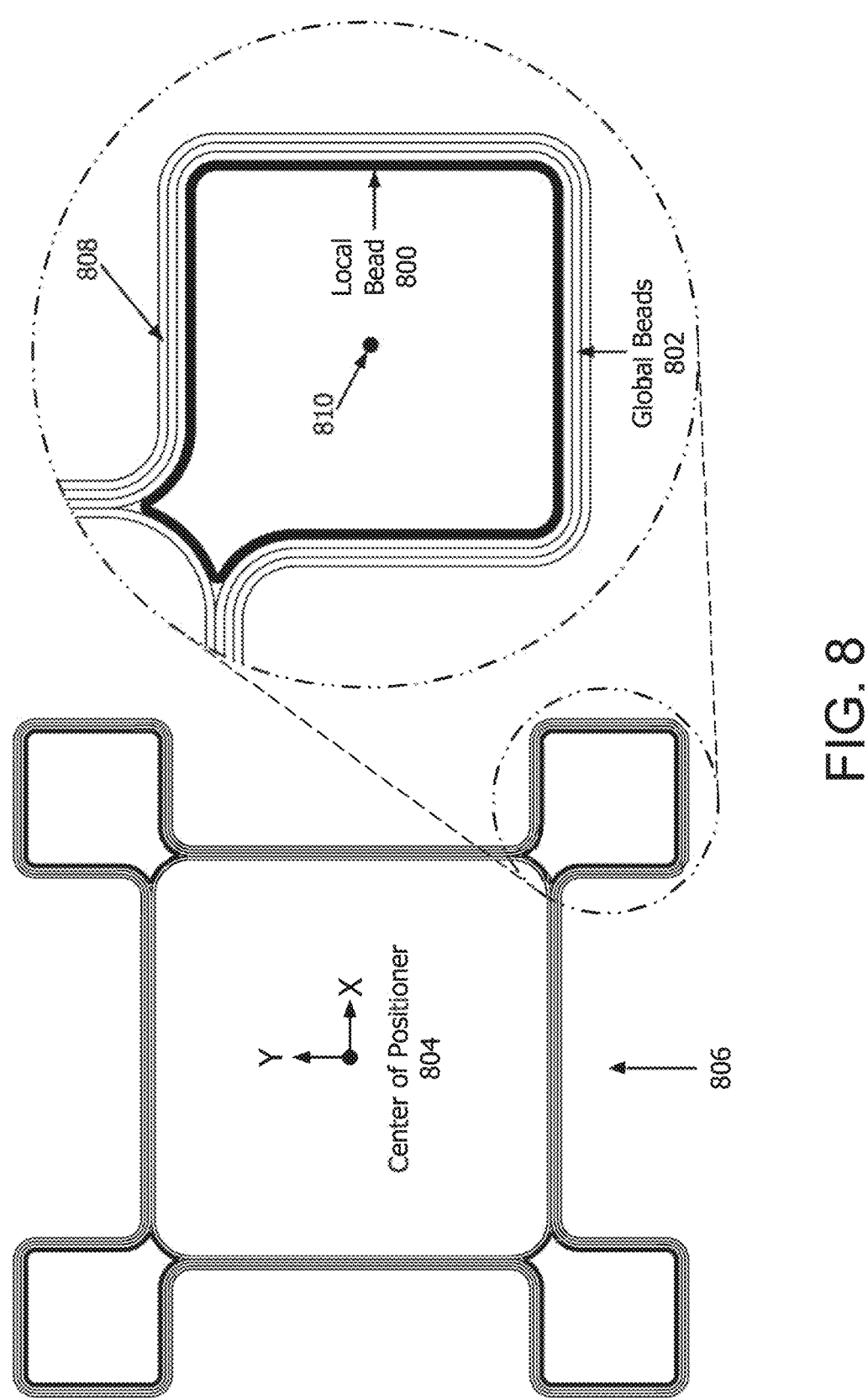
FIG. 8 provides an example illustration showing a visual distinction between global and local toolpath geometries.

Based on the disclosed bead scoring system, each deposition toolpath may be assigned a property that defines whether the bead(s) is(are) global or local. In some example, if the distance between the deposition toolpath's centroid and the center of the workspace positioner 804 falls under a certain threshold, the bead(s) is(are) defined or classified as global bead(s). Otherwise, the bead(s) is(are) defined or classified as local bead(s). The threshold may be dependent on or selected based on the geometry of the bead and the size of the bead path. Bead path size is dependent on the size of the deposition head to prevent robot-to-robot collisions. A visual distinction between global and local toolpath geometries is shown in FIG. 8. In some embodiments, a global bead may be defined based on other attributes, for example, a threshold distance between a deposition tool path (e.g., a starting point or ending point thereof), and another reference point (e.g., a robot arm, or distal end of a torch thereof).

In some embodiments, global beads span across the workspaces 500, 502, 504 of the articulated robots 402, 404, 406 and require full rotations from the workpiece positioner 408 for the robots 402-406 to access every segment of the path. In the example of FIG. 8, local beads 800 are in the workspace (e.g., workspace 504 of FIG. 5) of a single articulated robot (e.g., articulated robot 402 of FIG. 4) and necessitate restricted positioner rotation, within a half rotation, to enable the articulated robot to traverse the entire path. The print state alternates between printing global beads 802 and printing local beads 800. Every available articulated robot can be assigned either all local type beads or all global type beads during these respective states. This ensures that every articulated robot that is printing will require either large or small positioner rotations at the same time. This strategy decreases the downtime of any articulated robot waiting on a valid task and reduces the chances of collisions between articulated robots while printing beads.

Demonstration Builds

Two builds were prepared to test the asynchronous coordinated motion capabilities and machine intelligence of the system. The first build, shown in FIG. 9, was manufactured with mild steel wire using previously developed process parameters.

The shielding gas used was 95% Ar, 5% $CO_2$. The final part measured 184 mm in height (Z) and 978.66 mm in X and Y. Since this was the first use of asynchronous coordinated motion to collaboratively manufacture a component, the part was specifically designed to extend across a significant portion of the positioner to test the general functionality of the system and the motion control module.

The number of print-paths per layer was chosen to be an uneven multiple of the number of deposition heads to demonstrate the basic functionality of the bead scoring system. The build had 80 layers and featured eight beads (four global beads and four local beads) per layer. The bead logic module successfully distributed the groups of global and local deposition paths shown in FIG. 8.

During the build, the welding torch jammed in the automated torch-cleaning station several times. During those times, the bead logic system successfully reassigned beads to the other two robots until an operator could enter the caged cell and remedy the torch-cleaning station failure.

Simulation was performed on the first build to analyze the print allocation and efficiency of the multi-robot system. A comparison was made between a single robot and the multi-robot configuration. The deposition velocity for an individual robot remained constant to avoid variations in the production time. In the following TABLE 1, the print allocation percentage is the ratio of the assigned print-path length to the entire print-path length. TABLE 1 shows the simulated results of the first build using a multi-robot configuration. In this example, the ideal allocation percentage is 33.3%.

TABLE 1

|  | Print allocation percentage | Total print-path length (mm) |
|---|---|---|
| Robot-1 | 28.6 | 5956 |
| Robot-2 | 39.1 | 8144 |
| Robot-3 | 32.3 | 6739 |

In the following TABLE 2, the print uptime percentage is the ratio of the time during which deposition occurs to the total production time. TABLE 2 shows a simulated comparison between a single robot and multi-robot configuration. Bold indicates better outcome.

| Configuration | Production time (s) | Print uptime percentage |
|---|---|---|
| One robot | 1433 | 85.2 |
| Three robots | 599 | 90.2 |

TABLE 1 shows that a similar distribution of print tasks was assigned to the robots. The difference of the print allocations was caused by the uneven multiple number of print-paths. Robot-2 and Robot-3 were assigned an additional print-path and differed from each other due to their assigned print-path length. The multi-robot configuration had a 6% increase in print uptime percentage compared to using one robot, and the production time was cut by 58%, as shown in TABLE 2.

The second test was designed to analyze the system's productivity, e.g., deposition rate, and investigate the reliability of the hardware and software while running for extended periods of time. The second build, shown in FIG. 10, was designed to approach the maximum height of build envelope.

The desired final dimensions of the part were 1800 mm in height, 510 mm diameter at the base, and 152.4 mm diameter at the top. The sliced part contained 945 layers with three beads per layer and had a wall thickness of 12.9 mm. The small diameter near the top of the part was used to observe the effects of heat input by multiple deposition heads on shorter toolpaths and to test the asynchronous coordinated motion capabilities when the deposition heads are close together. The part was built with stainless steel wire using established parameters, and tri-mix (90% He, 7.5% Ar, 2.5% $CO_2$) was used as the shielding gas.

Figure 10:
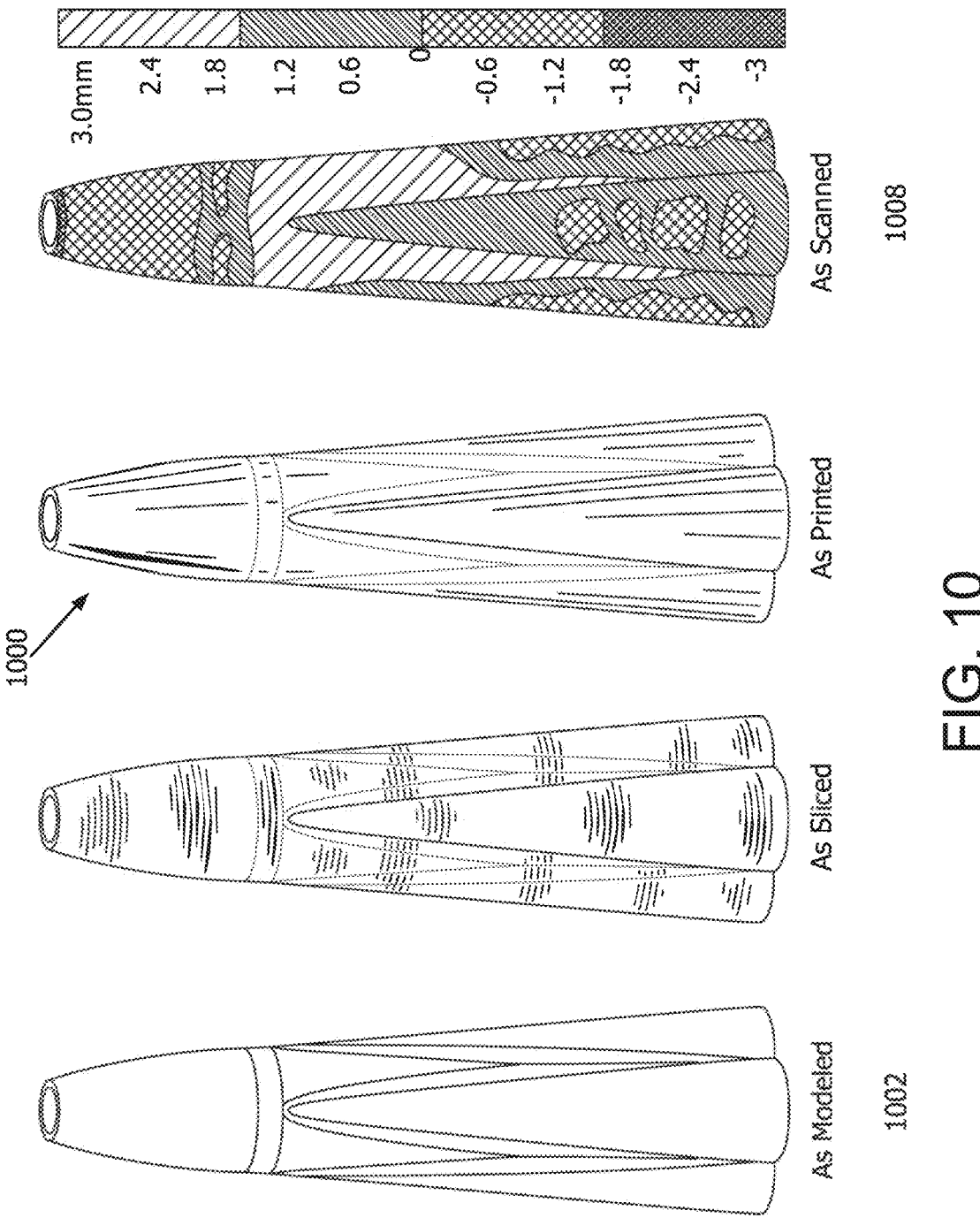
FIG. 10 provides an example illustration showing a build that was prepared to analyze the system's productivity, e.g., deposition rate, and investigate the reliability of the hardware and software while running for extended periods of time. This build was designed to approach the maximum height of build envelope. The system's geometric accuracy was tested as seen in FIG. 10.

The final part weighed 255 kg, and the nominal production rate was 14.7 kg/h. The limiting factor for the production rate of this build was the instability of the weld beads as temperatures approached 1000° C. near the top of the part. As the diameter of the part neared 300 mm at a build height of 1500 mm tall, one of the robots was unassigned print tasks to decrease the total power input. An additional robot was removed for assignment when the diameter reached 205 mm at a build height of 1705 mm tall, allocating all print tasks to a single robot for the remainder of the build. During this process, an available robot was switched with the original printing robot when it executed a service task. This decreased the overall service time required because of the ability to switch robots when the build was limited to less than three arms. Illustration 1008 of FIG. 10 shows the error between the CAD model and a 3D scan of the manufactured component. The average error was 0.46 mm with a standard deviation of 1.38 mm, which matches the 1 mm resolution seen in WAAM.

Simulation tests were also conducted for the second build with the addition of alternating robots to evaluate the performance of switching the active print robot while it is undergoing a service task. Since the second build only consisted of three print-paths per layer, an even distribution of print tasks was assigned for each robot with a slight variance due to the print-path lengths and is seen in the following TABLE 3. TABLE 3 shows simulated results of the second build using a multi-robot configuration. In this example, the ideal allocation percentage is 33.3%.

TABLE 3

| | Print allocation percentage | Total print-path length (mm) |
|---|---|---|
| Robot-1 | 33.3 | 919 |
| Robot-2 | 32.4 | 893 |
| Robot-3 | 34.4 | 946 |

The following TABLE 4 shows that alternating the robots was more effective than operating a single robot system, as it had a 19% and 17% improvement in production time and uptime percentage, respectively. Table 4 shows a simulated comparison between a single-, multi-, and single-alternating-robot configuration. Bold indicates better outcome.

TABLE 4

| | Production time (s) | Print uptime percentage |
|---|---|---|
| One robot | 251 | 67.8 |
| Three robots | 81 | 80.7 |
| Single-alternating robots | 204 | 79.6 |

TABLE 4 also shows that running all three robots resulted in the best performance when ignoring thermal conditions.

As evident from the above discussion, the present solution concerns a multi-robot intelligent deposition system configured to address the productivity and reliability limitations of conventional single-robot large-scale additive manufacturing systems. An extensible real-time print-path assignment strategy was developed whereby a toolpath database is loaded into a bead logic module and atomic deposition tasks are distributed using a bead scoring system. If a robot is temporarily out of service, then the bead logic redistributes the assigned print-paths to the remaining robots. Dynamic assignments lead to uninterrupted deposition and increased productivity. Asynchronous coordinated motion was successfully demonstrated for three robot arms and a one degree of freedom workpiece positioner.

Figure 11A:
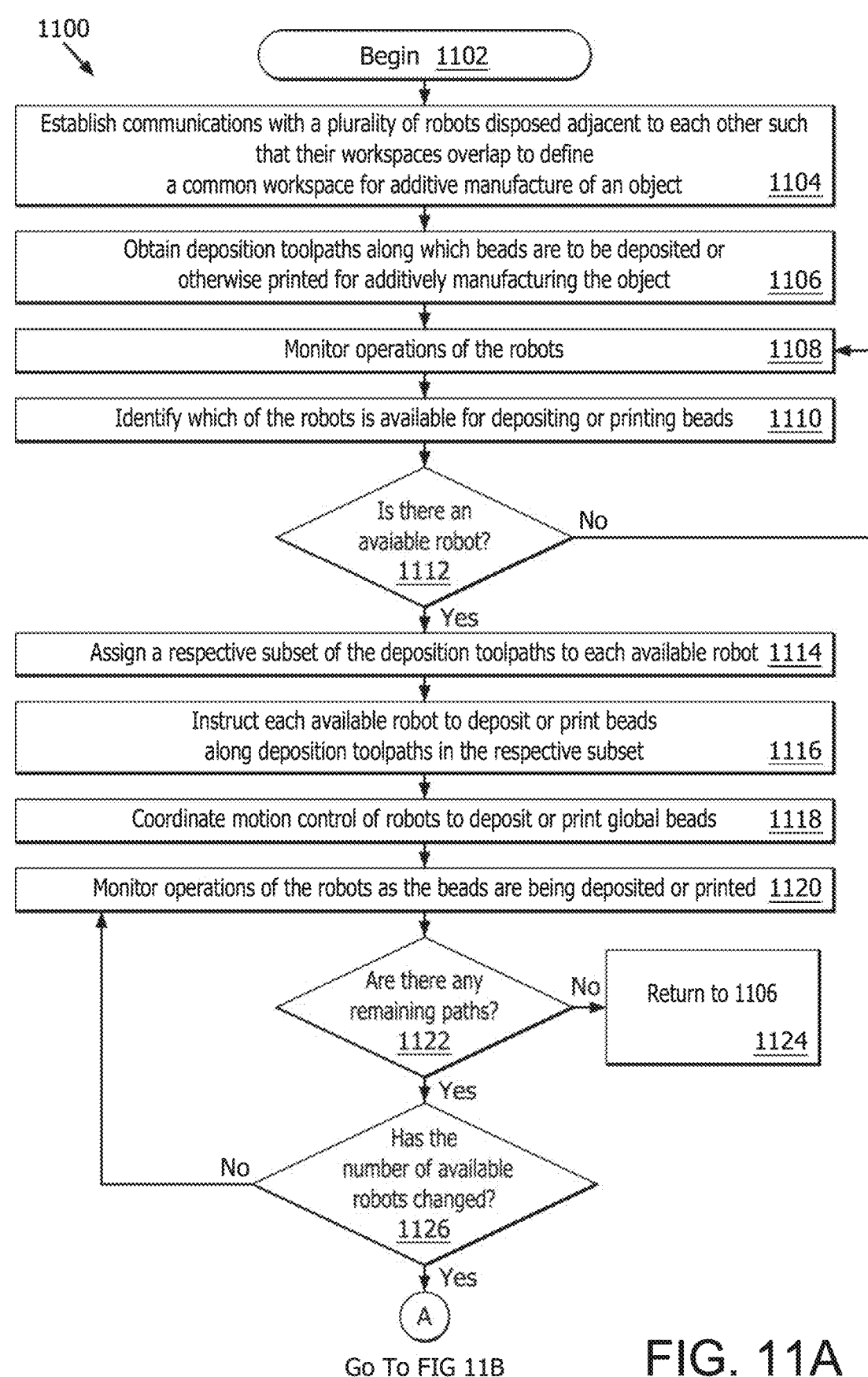
Figure 11C:
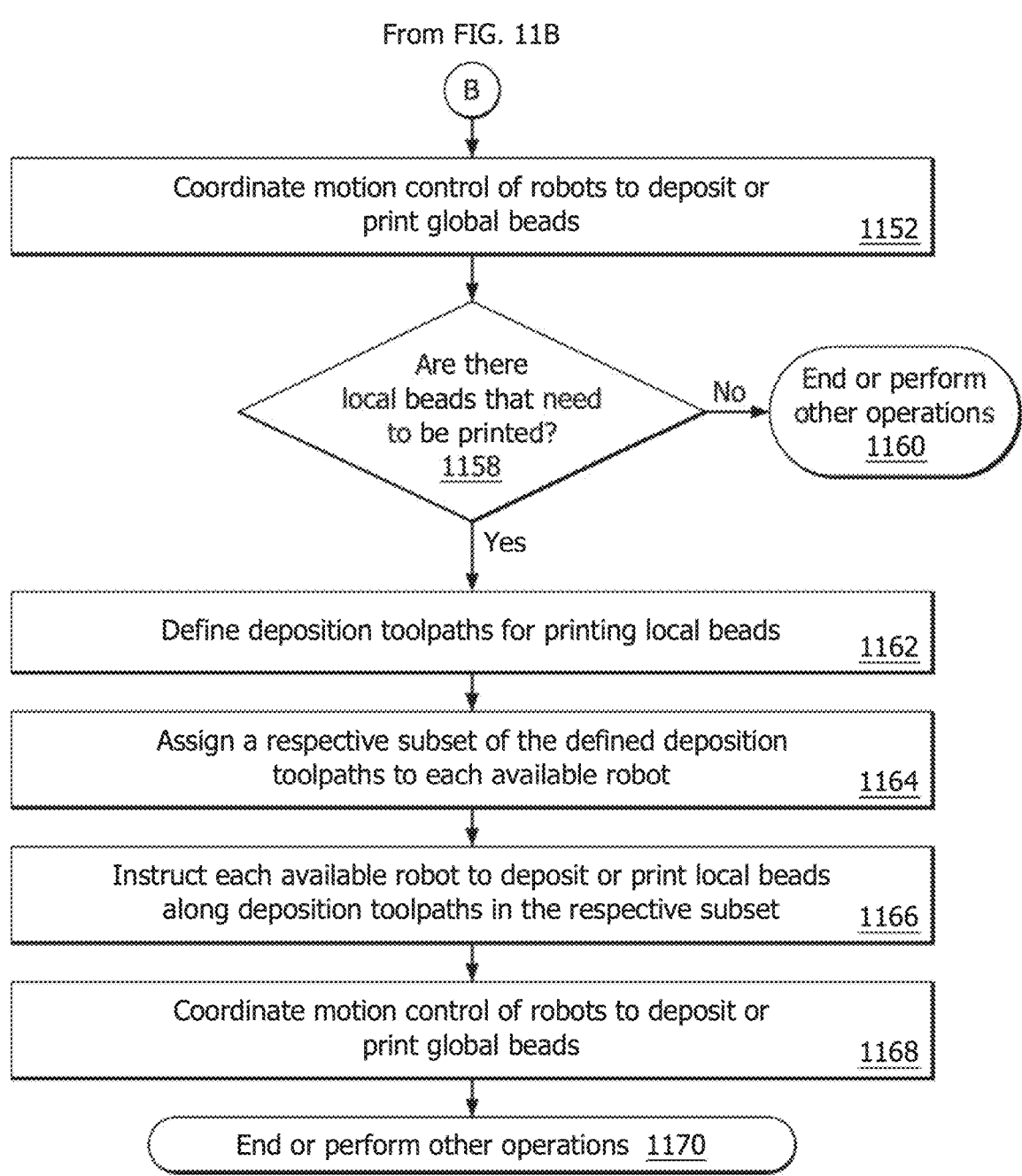

FIGS. 11A-11C provides a flow diagram of an example method 1100 for controlling robots (e.g., articulated robot(s) 402, 404, 406 of FIG. 4) to perform additive manufacturing to produce an object (e.g., object 806 of FIG. 8, 900 of FIG. 9, and/or 1000 of FIG. 10). The operations of blocks 1104-1168 may be performed in the same or different order than that shown. At least some of the operations of method 1110 may be performed by controller(s) 410, 414, 416, 418, 450 of FIG. 4, articulated robot(s) 402, 404, 406 of FIG. 4, and/or sensor(s) 496, 498 of FIG. 4.

Method 1100 begins with 1102 and continues to 1104 where a controller (e.g., controller(s) 410, 414, 416, 418, 450 of FIG. 4) establishes communications with the robots (e.g., articulated robot(s) 402, 404, 406 of FIG. 4). The robots are positioned adjacent to each other such that their workspaces (e.g., workspaces 500, 502, 504 of FIG. 5) at least partially overlap to define a common workspace (e.g., common workspace 506 of FIG. 5) for additive manufacturing of the object. Next in 1106, the controller obtains deposition toolpaths from a datastore (e.g., datastore(s) 452, 454 of FIG. 4). Any technique for accessing a datastore and retrieving information therefrom may be used here. The deposition toolpaths define paths along which beads are to be deposited or otherwise printed for additively manufacturing the object in a layer-by-layer basis or manner. The layer-by-layer basis or manner involves depositing, for each layer of the object, beads along paths associated with the layer. Operations of the robots are monitored by the controller in block 1108. This monitoring may be achieved using sensor data received from sensors of the system (e.g., sensor(s) 430, 488, 496, 498 of FIG. 4).

In block 1110, the controller identifies which of the robots is available for depositing or printing beads. This identification may be based on, for example, whether communication has been established with a robot, whether a robot is experiencing a fault or malfunction, whether a robot is currently performing a task, and/or operational state information for the robots. For example, the processor may: receive, from the robots, respective state information indicative of a robot being one of idle, active, in service, or off; monitor each robot's availability; and detect changes in each robot's availability based at least in part on the robot's state information. If there are no available robots for depositing or printing beads [1112:NO], then method 1200 returns to 1108 where the controller continues to monitor operations of the robots.

If one or more of the robots are available for depositing or printing beads [1112:YES], then the controller assigns a respective subset of the deposition toolpaths to each available robot in block 1114. The operations of block 1114 may include those of the blocks in FIGS. 11B and 11C. This initial deposition toolpath assignment may be made using a cost function and/or based on certain criteria. The criteria can include, but is not limited to, thermal properties T of the object to be manufactured, simulation results s of object deformations, sensor data S indicating temperatures and other thermal-related states of the object and/or portions of the object being manufactured, user defined toolpaths p that need to printed in a given sequence for multi-material layers, expected toolpath completion time(s) $t_c$, and/or geometric features g of object to be manufactured. The cost function may be defined as shown by the following mathematical equation (3).

$$F = (w_1 \cdot T) + (w_2 \cdot s) + (w_3 \cdot S) + (w_4 \cdot p) + (w_5 \cdot t_c) + (w_6 \cdot g) \quad (3)$$

where F represents a cost function result, $w_1$ represents a weight assigned to thermal properties of the object to be manufactured, $w_2$ represents a weight assigned to simulation results of object deformations, $w_3$ represents a weight assigned to sensor data indicating temperatures and other thermal-related states of the object and/or portions of the object being manufactured, $w_4$ represents a weight assigned to user defined toolpaths that need to printed in a given sequence for multi-material layers, and $w_5$ represents a weight assigned to expected toolpath completion time(s), and $w_6$ represents a weight assigned to geometric features g of object to be manufactured. Each of the weights $w_1$-$w_6$ may be any decimal or integer number selected in accordance with a given application.

In block 1116, the controller instructs each available robot to deposit or print beads along deposition toolpaths in the respective subset of deposition toolpaths. Any known or to be known technique for instructing robots to perform tasks can be used here. Motion control of the robots is coordinated in block 1118 as they deposit or print beads along the deposition toolpaths. The manner in which this coordinated motion control is achieved will become evident as the discussion progresses. Still, it should be understood that the controller is configured to cause the robots to optimally collaborate as they additively manufacture the object within the common workspace. An optimal collaboration may be a function of bead deposition speed, bead deposition placement accuracy, and/or a total number of predicted robot collisions. The robots may be considered as optimally collaborating when the bead deposition speed exceeds a threshold value, a bead deposition placement accuracy exceeds a threshold, and/or there are none or a relatively low number (e.g., <2, 5, 10, etc.) of predicted robot collisions.

In block 1120, the controller monitors operations of the robots as the beads are being deposited or printed. This monitoring may be achieved in the same or similar manner as the monitoring performed in block 1108.

In decision block 1122, the controller determines whether there are any remaining deposition toolpaths remaining or have not been completed. If not [1122:NO], then method 1100 returns to 1106 as shown by block 1124. Otherwise [1122:YES], method 1100 continues to decision block 1126 to determine whether the number of available robots has changed. This determination may be made based on one or more factors. The factors can include, but are not limited to, robot fault, robot malfunction, non-compliance of pre-defined rules specifying possible robot collision due to particular toolpaths being followed by robot(s), robot completion of respective toolpath(s), occurrence of a user-defined anomaly of robot performance, a welding torch malfunction, and/or a welding torch fault. Robot faults and malfunctions are well known. Welding torch malfunctions and faults are well known. The pre-defined rules can include, for example, a rule stating that if a first robot follows a first deposition toolpath and a second robot follows a second deposition toolpath conclude that a possible robot collision will occur. A user-defined anomaly of robot performance can include, but is not limited to, an inability of the robot to articulate or otherwise move its free end to a given area in a workspace due to system configuration and/or implementation. If the number of available robots has not changed [1126:NO], the controller returns to block 1120 and continues to monitor the robots as the beads are being deposited or printed. Otherwise [1126:YES], method 1100 continues to block 1128 of FIG. 11B.

As shown in FIG. 11B, block 1128 involves receiving, by the controller, sensed information relating to the object being additively manufactured at least partially within the common workspace. The sensed information may be received from one or more sensors of the system (e.g., sensor(s) 430, 488, 496, 498 of FIG. 4). In some example, the controller then determines, for each remaining deposition toolpath, a first difference between a centroid (e.g., centroid 810 of FIG. 8) of the remaining deposition toolpath (e.g., deposition toolpath 808 of FIG. 8) and a center (e.g., center 804 of FIG. 8) of the workspace positioner (e.g., workspace positioner 408 of FIG. 4). The controller may optionally select a threshold in block 1132 based on, for example, bead geometry and/or bead path size. If the first distance is less than the threshold [1134:YES], then method 1100 continues to block 1136 where the controller classifies the bead(s) as global bead(s). A global bead comprises a bead which may be deposited by two or more of the robots. The threshold may be selected, for example, to comprise a distance from one side of the common workspace to an opposing side of the common workspace. The common workspace may have a center that is set to center of the workspace positioner. If the first distance is equal to or greater than the threshold [1134:NO], then the controller classifies the bead(s) as local bead(s) in block 1138. A local global bead comprises a bead which may be deposited by only one of the robots. In some embodiments, the controller may determine that a bead is a global bead if the distance between the workpiece (e.g., between a start point or end point of a bead path) and each of two or more robots is below a threshold value such that the two or more robots may deposit the bead. For instance, the controller may utilize a measurement between a distal end of a torch or robot arm and the bead.

Once the beads have been classified as global or local beads, method 1100 continues to block 1140 where the controller determines, for each bead, a second distance from (i) an expected location of a deposition or print head of each remaining robot when depositing or printing the bead to (ii) a starting point of the remaining deposition toolpath. The controller also determines a length or a size of each bead, as shown by block 1142.

For each bead, the controller computes a score in block 1144 using a cost function based on the second distance D and/or the length/size of the bead Bs. The cost function may be defined by the above-provided mathematical equation (3).

Next in block 1146, the controller defines deposition toolpaths for printing the global beads. The deposition toolpaths may be defined based on the score computed in block 1144. For example, scores may be used to prioritize the beads relative to each other. For example, a bead with a higher score is considered as having a higher priority than a bead with a lower score, and vice versa. Deposition toolpath(s) is(are) then defined for depositing the beads in each given layer in accordance with an order defined by their relative scores and/or priorities.

The control performs operations in block 1148 to assign a respective subset of the defined deposition toolpaths to each available robot. The controller instructs each available robot to deposit or print global beads along the deposition toolpaths in the respective subset, as shown by block 1150. Thereafter, method 1100 continues to block 1152 of FIG. 11C.

As shown in FIG. 11C, block 1152 involves coordinating motion control of robots to deposit or print global beads. The manner in which this coordinated motion control is achieved will become evident as the discussion progresses.

Next in block 1154, the controller determines whether there are local beads that need to be printed. If not [1158:NO], method 1100 continues to block 1160 where it ends or other operations are performed (e.g., return to block 1102).

If there are local beads that need to be printed [1158:YES], method 1100 continues with the operations of blocks 1162-1168. These operations involve: defining deposition toolpaths for printing local beads; assigning a respective subset of the defined deposition toolpaths to each available robot; instructing each available robot to deposit or print local beads along deposition toolpaths in the respective subset; and/or coordinating motion control of robots to deposit or print global beads. Subsequently, method 1100 continues to block 1170 where it ends or other operations are performed (e.g., return to 1102).

FIG. 12 provides a flow diagram of another example method 1200 for controlling a plurality of robots (e.g., articulated robot(s) 402, 404, 406 of FIG. 4). The robots may be disposed adjacent to one another such that workspaces thereof overlap to define a common workspace. Each robot may be configured to additively manufacture an object within the common workspace, and/or configured to additively manufacture an object in a-layer-by-layer manner by following deposition toolpaths in an order defined by a plurality of layers of the object.

Method 1200 begins with 1202 and continues with 1204 where a processor (e.g., controller(s) 410, 414, 416, 418, 450 of FIG. 4) obtains deposition toolpaths along which beads are to be deposited for additively manufacturing the object. The processor then assigns subsets of the deposition toolpaths to available robots, as shown by block 1206. In 1208, the processor instructs each of the available robots to deposit beads corresponding to the deposition toolpaths of a respective one of the subsets of deposition toolpaths assigned thereto.

When a number of available robots changes while manufacturing of the object, the processor performs the operations of following block 1210. These operations involve: (1212) defining new deposition toolpaths for printing beads; (1214) assigning a respective subset of the new deposition toolpaths to each one of the available robots; and (1216) instructing each one of the available robots to deposit beads corresponding to the new deposition toolpaths of the respective subset.

Block 1212 may involve: determining, for each remaining deposition toolpath, a first difference or distance between a centroid of the remaining deposition toolpath and a center of a workspace positioner; classifying beads based on a comparison of the first distance to a threshold; determining, for each bead, a second distance from (i) an expected location of a deposition or print head of each remaining one of the available robots when depositing the bead to (ii) a starting point of the remaining deposition toolpath; and computing, for each bead, a score using the second distance and bead size. At least one of the beads may be classified as a global bead when the first difference is less than the threshold. The global bead may comprise a bead which may be deposited by two or more of the plurality of robots. At least one of the beads may be classified as a local bead when the first difference is greater than the threshold. The local bead may comprise a bead which may be deposited by only one of the plurality of robots. The score may comprise a weighted combination of the second distance and bead size. First, new deposition toolpaths for depositing global beads may be defined in block 1212 based on the scores associated with the beads classified as global beads. Second, new deposition toolpaths for depositing local beads may be defined in block 1212 based on the scores associated with the beads classified as local beads.

In next block 1218, the robots perform operations to deposit the global and local beads. The global beads may be deposited prior to any of the local beads being deposited. Subsequently, method 1200 continues to block 1220 where it ends, or other operations are performed.

Figure 13:
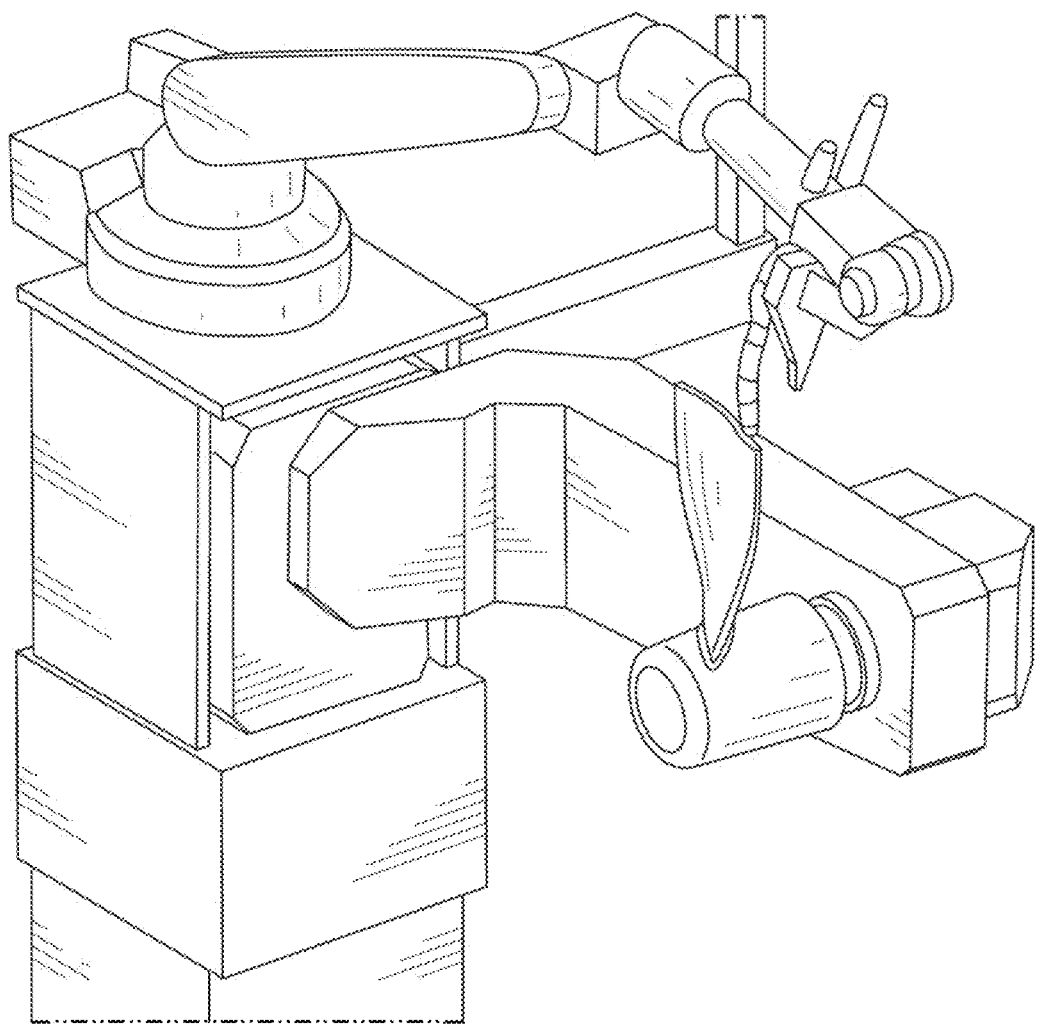
FIG. 13 provides an illustration showing an example of two agents using coordinated motion that was preplanned using computer aided manufacturing.

As noted above, the present solution implements coordinated motion control for the articulated robots (e.g., articulated robot(s) 402, 404, 406 of FIG. 4). Existing methods of coordinated motion control require pre-processed toolpaths to control each individual agent. This method is acceptable for coupled systems such as a 5-axis computer numerical control (CNC) milling machine or a six degree of freedom (6-DOF) robotic arm paired with a one to two degree of freedom (1-2 DOF) robot positioner. FIG. 13 shows an example of two agents (6-DOF robotic arm and a 2 DOF positioner) using coordinated motion that was preplanned using computer aided manufacturing (CAM). Difficulties arise when introducing more agents to the system. The CAM software would need to consider potential collisions with each agent and must pre-plan the full coordination for all agents in the system. This would increase overall labor time as the user must meticulously check for each planned path with each agent to ensure they are in the correct position at the desired time.

Figure 14:
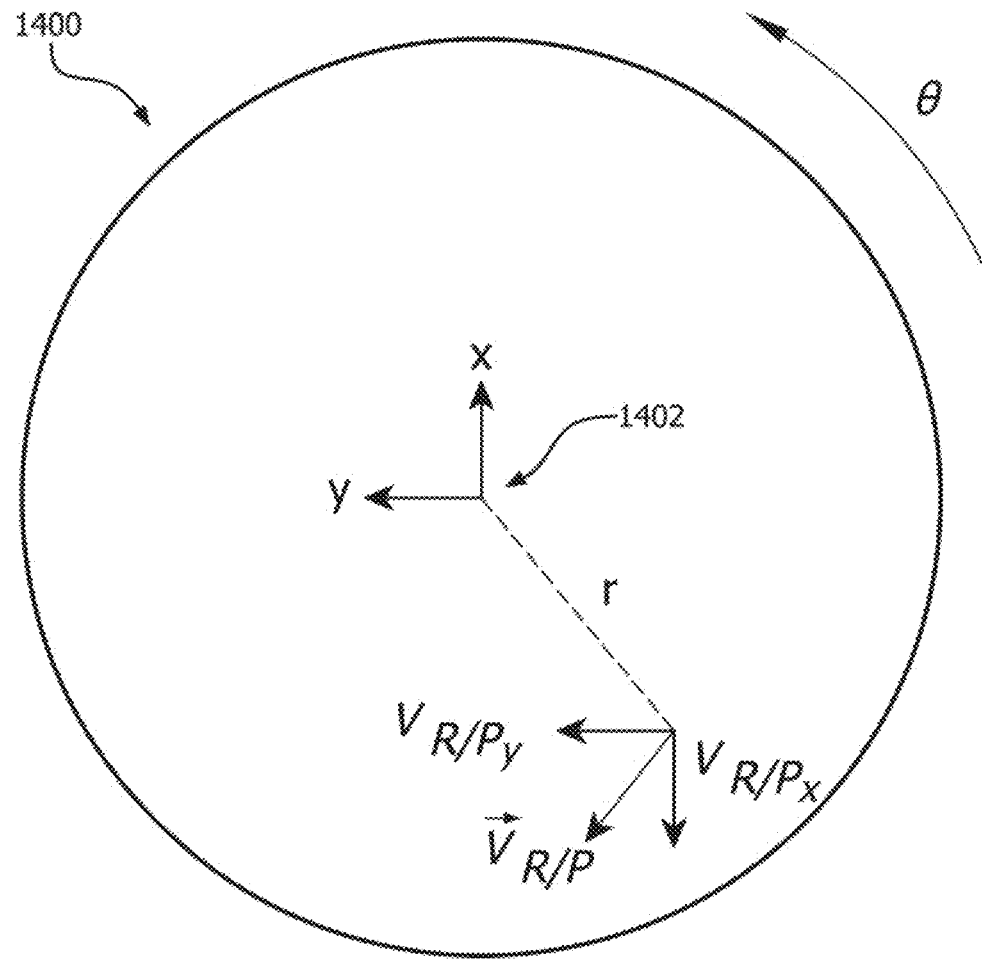
FIG. 14 provides an illustration that is useful for understanding how an average angular velocity is computed for multiple robots.

The proposed solution involves kinematically chaining the agents based on prioritizing a main agent that drives the main motion while the other agents respond to the main agent and adaptively change their trajectory. Velocity based motion control is used to coordinate the motion with the desired toolpaths. This removes the need to rely on the generated deposition toolpaths to have commands for specific joints to coordinate the motion thus simplifying the deposition toolpath generation. The proposed solution uses a one degree of freedom (1-DOF) workpiece positioner table to drive the main motion of the articulated robots (e.g., 6-DOF robotic arms) equipped with tools to enable an additive manufacturing process. The rotational motion of the workpiece positioner is driven using the above-provided mathematical equation (2) for angular velocity. This computation is depicted in FIG. 14. In FIG. 14, $\dot{\theta}$ is the angular velocity. r is a scalar radius of circle 1400. $\vec{V}_{R/P}$ is the velocity vector of the robot tool relative to the workpiece positioner 408. The robot tool can include, but is not limited to, the heating elements (e.g., welding torches) 440 of FIG. 4 that are disposed at a distal free end of an articulating robotic arm.

$\vec{V}_{R/P}$ is a provided input. The scalar radius r is determined by the distance between an origin point 1402 and the robot tool. When multiple robots are coordinating with the workpiece positioner 408, each angular velocity is determined. An average angular velocity for the multiple robots is then computed. The average angular velocity is used for controlling motion of the workpiece positioner 408.

A robot tool's velocity can be obtained using the following mathematical equation (5).

$$\vec{V}_R = -\vec{V}_P + \vec{V}_L + \vec{V}_E \qquad (5)$$

where $\vec{V}_R$ is a velocity vector of the robot, $\vec{V}_P$ is the tangential velocity vector of the workpiece positioner, $\vec{V}_L$ is a vector for a tool center point velocity which may be referred to as a linear movement velocity vector of a robotic tool, and $\vec{V}_E$ is an error correction velocity vector. $\vec{V}_P$ is negative to correct the relative velocity in relation to the positioner. $\vec{V}_L$ uses the velocity input of $\vec{V}_{R/P}$. Lastly, $\vec{V}_E$ is used to ensure that the robot does not deviate from the deposition toolpath and uses closed loop control to maintain the trajectory. This is addressed above. The error correction velocity $\vec{V}_E$ uses proportional control to maintain the trajectory by using the error between distance of the planned trajectory and the current position of the robot. The gain is tuned by running multiple toolpaths for each robot. An example equation is Ve=Kp*e(t), where Kp is the proportional gain and E(t) is the error between the distance of the planned trajectory and current position of the robot. It should be noted that other forms of the closed-loop controller can be used for obtaining the correction velocity.

The motion control technique described herein enables sharing a workspace by multiple robots, optimizes robot allocation, improves system productivity, and increases quality of the printed part. The motion control technique can be used generally in fields such as manufacturing. More specifically, the disclosed technologies can be used for multi-robot coordination on-the-fly, on-demand, and/or in real time.

FIG. 15 provides a flow diagram of an illustrative method 1500 for controlling motion of robots (e.g., articulated robot(s) 402, 404, 406 of FIG. 4) in a coordinated manner during an additive manufacturing process. The robots may be positioned adjacent to one another such that workspaces thereof overlap to define a common workspace. Each robot may be configured to facilitate additively manufacturing an object within the common workspace, and/or configured to facilitate additively manufacturing an object in a-layer-bylayer manner by following deposition toolpaths in an order defined by a plurality of layers of the object.

The operations of method 1500 may be performed in the same or different order than that shown. Method 1500 may also be combined with the above-described methods. For example, method 1500 may be performed in blocks 1118, 1152, 1168 of FIG. 11, and/or blocks 1208, 1216, 1218 of FIG. 12.

Method 1500 begins with 1502 and continues with 1504 where a workpiece positioner is considered by a processor (e.g., controller(s) 410, 414, 416, 418, 450 of FIG. 4) as a primary agent for driving robotic motion of a system (e.g., system 400 of FIG. 4). A tool center point velocity is obtained in block 1508 for each robot. The tool center point velocity may be pre-defined, pre-specified, previously provided, and/or stored in a local or remote datastore (e.g., datastore 454 of FIG. 4).

Next in block 1510, the processor determines a distance between a center of the workpiece positioner and a robotic tool located at a distal free end of a respective robot. This distance is used as a radius in block 1512 to compute an angular velocity of the workpiece positioner. These operations of blocks 1510, 1512 are repeated for each of the other robots. An average angular velocity is computed in block 1516 by averaging the angular velocities computed for the robots in blocks 1510-1514.

In block 1518, the processor determines, for each robot, a relative tool velocity based on the tool center point velocity and the average angular velocity of the workpiece positioner. The relative tool velocity may be determined using above-provided mathematical equation (5).

A trajectory for at least one robot is adjusted in block 1520 based on the respective relative tool velocity. The trajectory may define a deposition toolpath along which beads are to be deposited for additively manufacturing the object. For example, the tool velocity specified for the trajectory may be replaced with the respective relative tool velocity. The present solution is not limited in this regard. Other adjustments to the trajectory may be made in view of the respective relative tool velocity. The change of the trajectory occurs when the positioner moves since the original path has been relocated by the rotation of the positioner. Limits in the angular velocity can be controlled by the user and movement of positioner can be disabled if needed (e.g., a geometry not suitable with using the positioner).

In block 1522, the rotational motion of the workpiece positioner is controlled based on the average angular velocity computed in block 1516. Any known or to be known technique for controlling rotation motion of a workpiece positioner may be used here. For example, the processor may control actuation of gear(s) and/or motor(s) to increase or decrease the rotational velocity of the workpiece position in accordance with the average angular velocity.

The robot(s) is(are) controlled in block 1524 to follow the adjusted trajectory(ies). Any known or to be known technique for controlling robots to follow a trajectory can be used here. For example, the processor may control actuation of joints of an articulating arm so that the tool at the distal free end thereof moves along a path in accordance with the trajectory.

The operations of blocks 1508-1524 may optionally be repeated one or more times until a robotic mission, goal or task is completed. A robotic mission may include, but is not limited to, additively manufacturing one or more objects. A robotic goal may include, but is not limited to, additively manufacturing one or more objects with no or a minimal number of robot collisions. A robotic task may include, but is not limited to, disposing beads in one or more layers. Subsequently, method 1500 continues to block 1528 where it ends or other operations are performed.

Calibration

Multiple robots can deposit metal layers in parallel and/or perform different activities, reducing the fabrication time and improving the productivity of a robotic system. The robotic system can include, but is not limited to, a WAAM. Coordinating multiple robots poses key challenges, such as ensuring that all the robots coordinate their activities successfully and that each robot is calibrated.

The present solution is directed to implementing systems and methods for calibrating multiple robots performing additive manufacturing. The robots are configured to coordinate their motions and actions to deposit complex shapes and structures that are difficult or impossible to achieve with a single robot. The robots can adjust their deposition parameters and strategies according to the feedback from sensors and models, improving the quality and accuracy of the robotic system.

The present solution has many advantages. For example, the use of multiple robots provides enhanced performance, increased reliability, and improved scalability. Multiple robots can perform tasks faster, more efficiently, and more robustly than a single robot, especially in large-scale, dynamic, or uncertain environments. Multiple robots can provide redundancy and fault-tolerance, as well as adapt to changing conditions and recover from failures. Multiple robots can handle tasks that are beyond the capabilities of a single robot, such as covering a large area, manipulating heavy objects, or forming complex shapes.

The robots need to be calibrated to ensure that they have consistent and accurate information about their own state, the state of other robots, and the state of the environment. The robots should coordinate their actions and behaviors to achieve a common goal or perform a complex task. Coordination can be complicated by conflicting objectives, heterogeneous preferences, or emergent phenomena.

The methodology to calibrate the robots and positioners together uses a tracking target to be mounted to the end effector of the robot and to the positioner. The robots draw a known shape such as a rectangular prism. The system observes the shapes made and compares them to the theoretical shapes. The system calculates the offsets for each robot and applies the kinematic adjustment for all six degrees of freedom. The process is iterated until the robots and positioner are able to hit the same positions in space within reasonable error.

Figure 16:
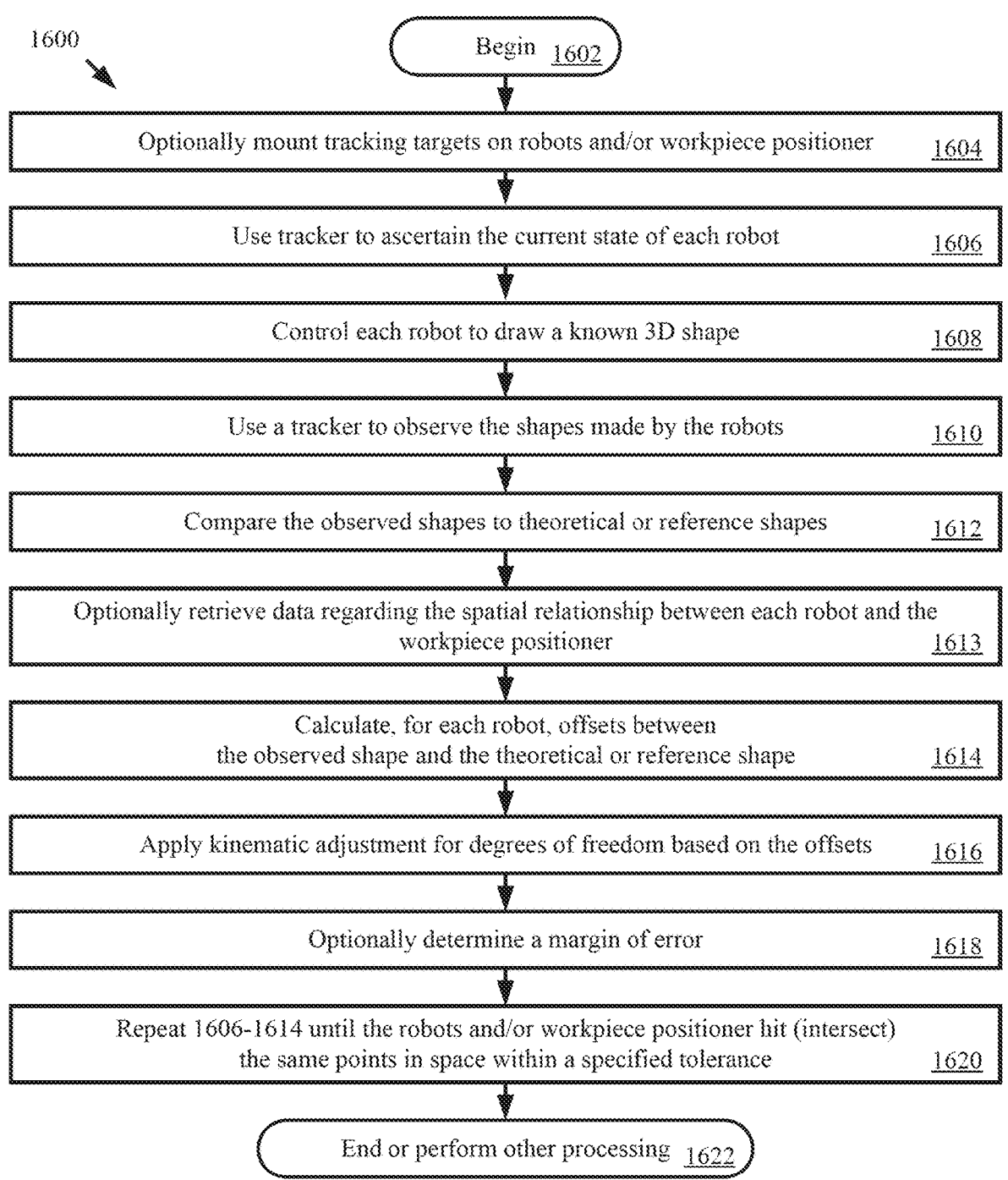
FIG. 16 provides a flow diagram of an illustrative method for calibrating a multi-robot system.

FIG. 16 provides a flow diagram of an illustrative method 1600 for calibrating robots (e.g., robots 402-406 of FIG. 4) and/or workpiece positioner (e.g., workpiece positioner 408 of FIG. 4). A tracking target (e.g., tracking target 458, 459 of FIG. 4) may be provided with each robot and/or workpiece positioner to assist a tracker (e.g., laser tracker 430 of FIG. 4) with ascertaining a current state of the same. This is shown by optimal block 1604. One of the tracking targets may be mounted on an end of the articulating robotic arm of each robot. A tracking target may be mounted on a surface of the workpiece positioner. Each tracking target may comprise, for example, a reflector. The reflector can include, but is not limited to, a colored ring reflector.

Figure 18:
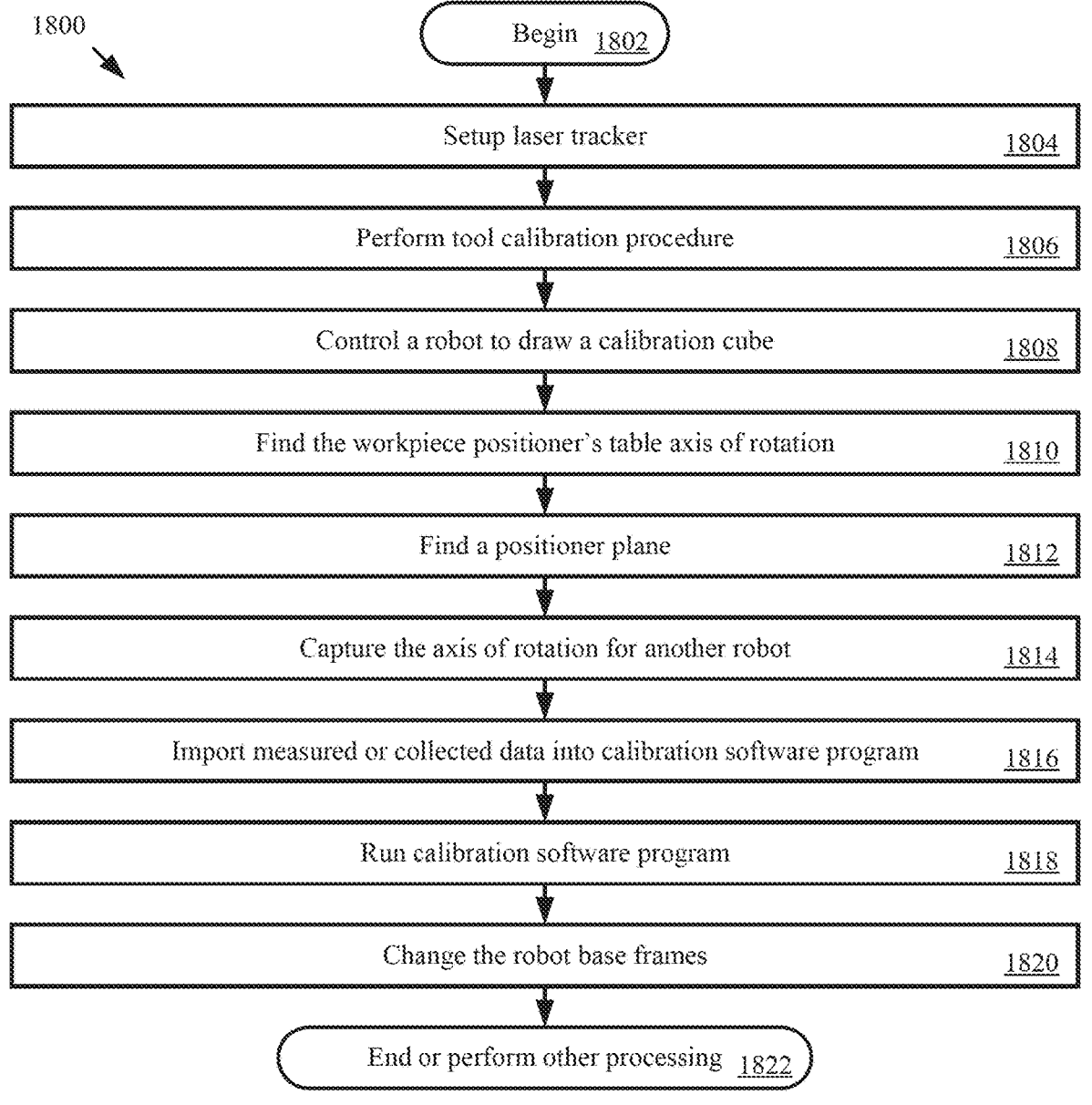
FIG. 18 provides a flow diagram of another illustrative method for calibrating a multi-robot system.

Method 1600 may include more or fewer operations than shown. The operations of method 1600 may be performed in the same or different order than that shown. Some or all of the operations of method 1600 may be combined with some or all of the operations of other methods (e.g., methods 1800 of FIG. 18, 2100 of FIGS. 21, and/or 2200 of FIG. 22) discussed below.

Method 1600 continues to block 1606 where the tracker is used to ascertain the current state of each robot. The tracker can be used to establish a local coordinate system for each robot (also referred to herein as a base frame for each robot). This may be done, for example, by moving the robot arm (with the tracking target attached to a distal end thereof) to various positions in space for each robot and tracking the tracking target to derive where the x, y, and z axes lie for each respective robot. This may also include changing the roll (rotation around the x-axis), pitch (rotation around the y-axis), and yaw (rotation around the z-axis) of each robot. The system orientation may be expressed in any other form than roll, pitch and yaw.

Next in block 1608, each robot is controlled to draw a known shape or an object in space with the tracking target attached to the distal end of its arm. For example, each robot may draw a cube or a rectangular prism. The tracker performs operations in block 1610 to observe the shapes drawn by the robots. Any known or to be known technique for observing objects can be used here. The tracker also records a position of the tracking target at each position (e.g., at each corner of the cube or rectangular prism, etc.). Each observed drawn shape is compared by a processor (e.g., main controller 410 of FIG. 4 and/or controller(s) 414, 416, 418 of FIG. 4) to a theoretical shape, as shown by block 1612.

Next in block 1614, the processor calculates, for each robot, offsets between the drawn shapes relative to the theoretical shape. The processer applies kinematic adjustments in block 1616 to each robot based on the offsets. The kinematic adjustments may be made to some or all of the six degrees of freedom. The six-degrees of freedom may be translated along the x, y, and z axis, and the roll, pitch, and yaw axes of rotation.

In some scenarios, the offsets may be determined and the kinematic adjustments may be made after retrieving additional data regarding the spatial relationship between each robot and a positioner as shown by optional block 1613. The additional data may be retrieved from a datastore of the main controller (e.g., main controller 410 of FIG. 1) and/or a datastore of a robot controller (e.g., controller 414, 416, 418 of FIG. 4). Block 1613 may involve determining a center of rotation of a positioner table used to support a workpiece for the additive manufacturing process. This may include installing the tracking target on a portion of the positioner table to determine its axis of rotation (by rotating the positioner to draw a circle) and/or determining a plane of the positioner (by sweeping an upper surface of the positioner with the tracking target). Block 1613 may also involve determining, for one or more robots, an axis of rotation of the one or more robots by drawing an arc or circle and recording the spatial data points via the tracking target mounted on the end of the robot arm. The spatial data points associated with the arc or circle drawn by the one or more robots may subsequently be compared with the arc or circle drawn by the positioner to determine whether the one or more robots' perceived axis or center of rotation of the positioner is aligned with the actual axis or center of rotation of the positioner. For example, this additional data may be used in block 1614 for determining the offsets (derived from the actual axis of rotation of the positioner and the perceived axis of rotation of the positioner based on the arc or circle drawn by the one or more robots in block 1613. In further embodiments, the additional data may show where the positioner is in a 3D space. The additional data may provide a reference location in the 3D space to facilitate an understanding of the spatial relationship of the robots relative to each other and relative to the positioner. The offsets may be computed using an algorithm which is a function of the reference location and kinematics of the system. A margin of error may optionally be determined using the additional data, as shown by block 1618.

The operations of blocks 1606-1618 may be repeated until the robots and/or the workpiece positioner hit (or intersect at) the same points in space within a specified tolerance. This is illustrated by block 1620. The accuracy of the calibration increases with the number of iterations. Subsequently, method 1600 continues to block 1622 where it ends or other operations are performed (e.g., go to block 1602).

The primary goal for calibrating the robotic system is to adjust the base frames of the robots such that the world origins of each robot are coincident and the axes of the world frames for each robot are colinear. In addition to the robot-to-robot calibration, each robot should be able to find the center of rotation (CoR) of the workpiece positioner table. As a matter of convenience, the origin may be defined as the point that lies at the intersection between the workpiece positioner's axis of rotation and the plane of the workpiece positioner.

Figure 17:
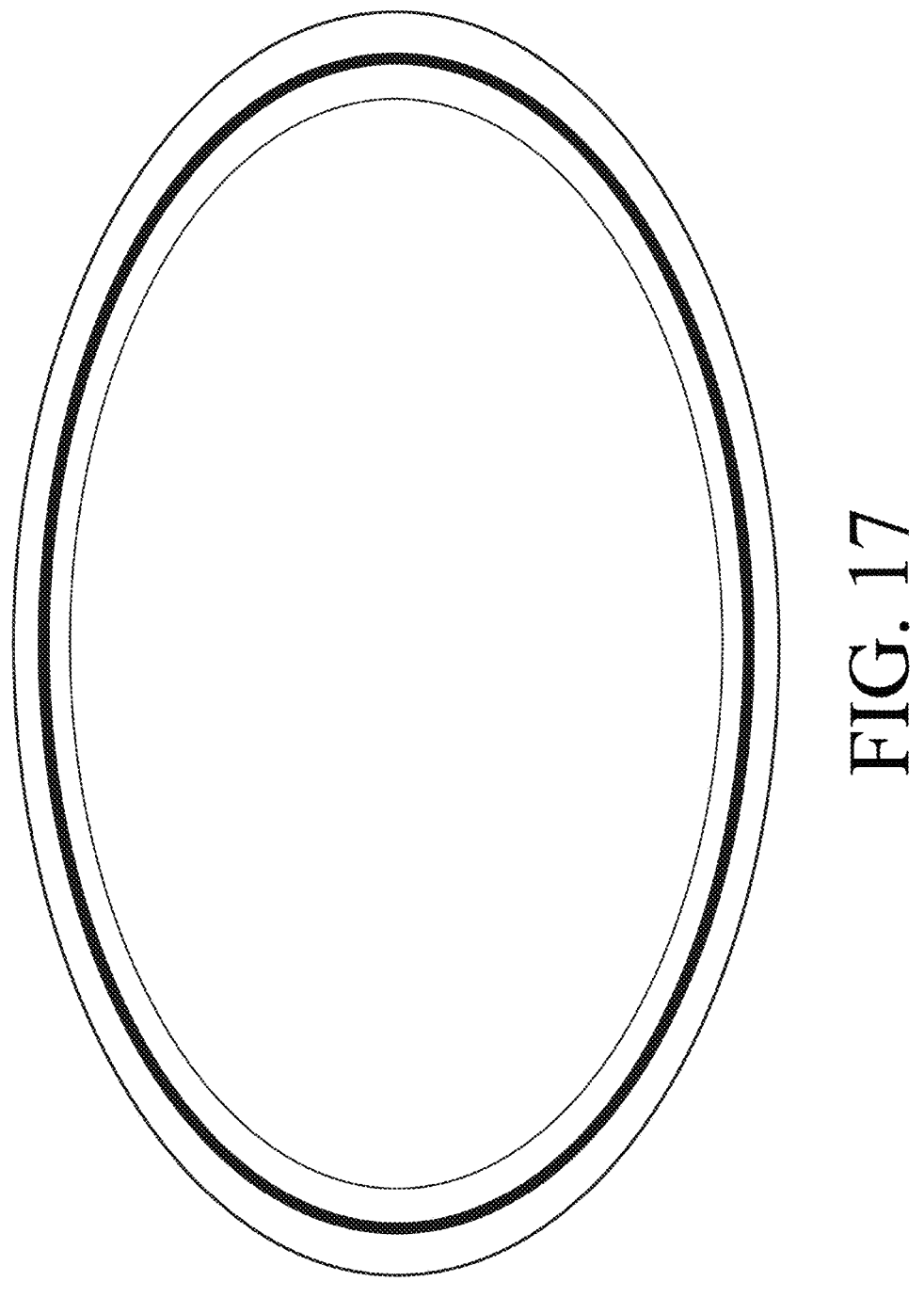
FIG. 17 provides an image of circles drawn by an uncalibrated system.

An easy indicator for the calibration of the robotic system can be seen by using marker tools to draw three equidistant concentric circles on the workpiece positioner table. This action is performed by moving each robot to a point on the three concentric circles and jogging the workpiece positioner table to draw the circles on a large sheet of paper. An image of the circles drawn by an uncalibrated system is shown in FIG. 17. The circles are not equally spaced. This is a good indicator that the robots' perceived center of rotation of the workpiece positioner table is not coincident (aligned) with the actual center of rotation of the workpiece positioner table. The unequally spaced circles may also indicate that the robots' perceived coordinate frame axes of the workpiece positioner do not coincide with the workpiece positioner plane or axis of rotation. There may be a requirement that the origins are coincident and the robots' perceived z-axes are aligned with the direction of rotation, for example, by comparing a z-axis of the robot (e.g., a vertical line drawn by the robot arm with a tracking target affixed thereto to derive point cloud data) relative to a z-axis of the workpiece positioner, e.g., to assess whether the vertical line is parallel with the z-axis of the workpiece positioner.

An experimental calibration of articulating robots was performed. An absolute laser tracker was used with metrology software to measure and record the data of robot paths and capture the topology of the workpiece positioner table. The calibration procedure was attempted with a multiplicity of different methods involving various measurements and algorithms. The method 1800 outlined in FIG. 18 featured the smallest error and used the least amount of measured data.

Method 1800 begins at block 1802 and continues to block 1804 where a laser tracker (e.g., laser tracker 430 of FIG. 4) is set up. Before beginning the calibration procedure, the laser tracker may be heated up and calibrated. This action may be performed via a software (e.g., utility software) that configures, checks and calibrates a tracker.

In block 1806, a tool calibration procedure (TCP) is performed for each robot. Tools have been designed to hold the tracking targets (e.g., tracking target 458, 459 of FIG. 4) used with the laser tracker. The tracking targets can include, but are not limited to, magnetic red ring reflectors, retroreflectors, reflective tape, other reflective objects, or any other object that may be tracked. The TCP (e.g., workpoint) for a new tool (e.g., a robotic MIG gun) may be defined via a multi-point calibration procedure where the orientation (i.e., posture) of the TCP is varied between specific orientations (e.g., 3-9 different orientations) while maintaining the same XYZ location. This method normally involves a static reference object to ensure the XYZ location remains consistent at each orientation (e.g., at each point). That is, the robot arm may be manipulated to a plurality of different postures to confirm that the tool (in each posture) has the same TCP in space. For example, a 6-point calibration procedure may be used to define the tool. The 6-point method may involve varying the orientation of the TCP between six distinct orientations. In this manner, a laser tracker may be used to capture an initial XYZ position, wherein the robot may be returned to that XYZ position (measured by the laser) for each of the subsequent measurements.

In block 1808, a robot is controlled to draw calibration cubes. Each robot task contains a module. This module contains the routines necessary to calibrate the system. The first routine for each robot draws a cube centered around the origin of the robot's perceived world reference frame. To capture the data for one robot, the first routine was stepped through and the 3D metrology software was used to record the laser trackers position at each corner of the cube. In the 3D metrology software, each cube should be recorded as a point cloud. Before capturing each point, operations were performed to ensure that the position of the robot has stabilized at each corner by observing the XYZ location of the laser tracker in the 3D metrology software. After running the calibration cubes, three 8-point point clouds were collected.

To find the positioner table's axis of rotation, a red ring reflector was placed in one of the holes on the outside of the workpiece positioner. In the 3D metrology software, an option was chosen to record a circle. This measurement requires two operators. One operator will slowly jog the positioner approximately 360 degrees while the other ensures that the laser tracker maintains visibility of the red ring reflector. After recording the data, the system collected a 3D Point representing the center of the circle, a normal vector to the positioner circle, and a diameter measurement.

In block 1812, the positioner plane is found by sweeping the surface of the workpiece positioner with the (1.5 in) red ring reflector. In the 3D metrology software, an option was chosen to record a best fit plane. Before beginning to sweep the table, actions were taken to ensure that the workpiece positioner was moved to the home position. The red ring reflector was moved across the surface of the workpiece positioner's table attempting to sweep the maximum amount of area. After recording the data, the system collected a 3D point representing the location of the plane and a normal vector representing the direction of the plane. The red ring reflector used in the calibration was 1.5" in diameter. In the calibration code, the plane is offset −0.75" (in the direction of the plane normal) to account for the height of the reflector.

Figure 19:
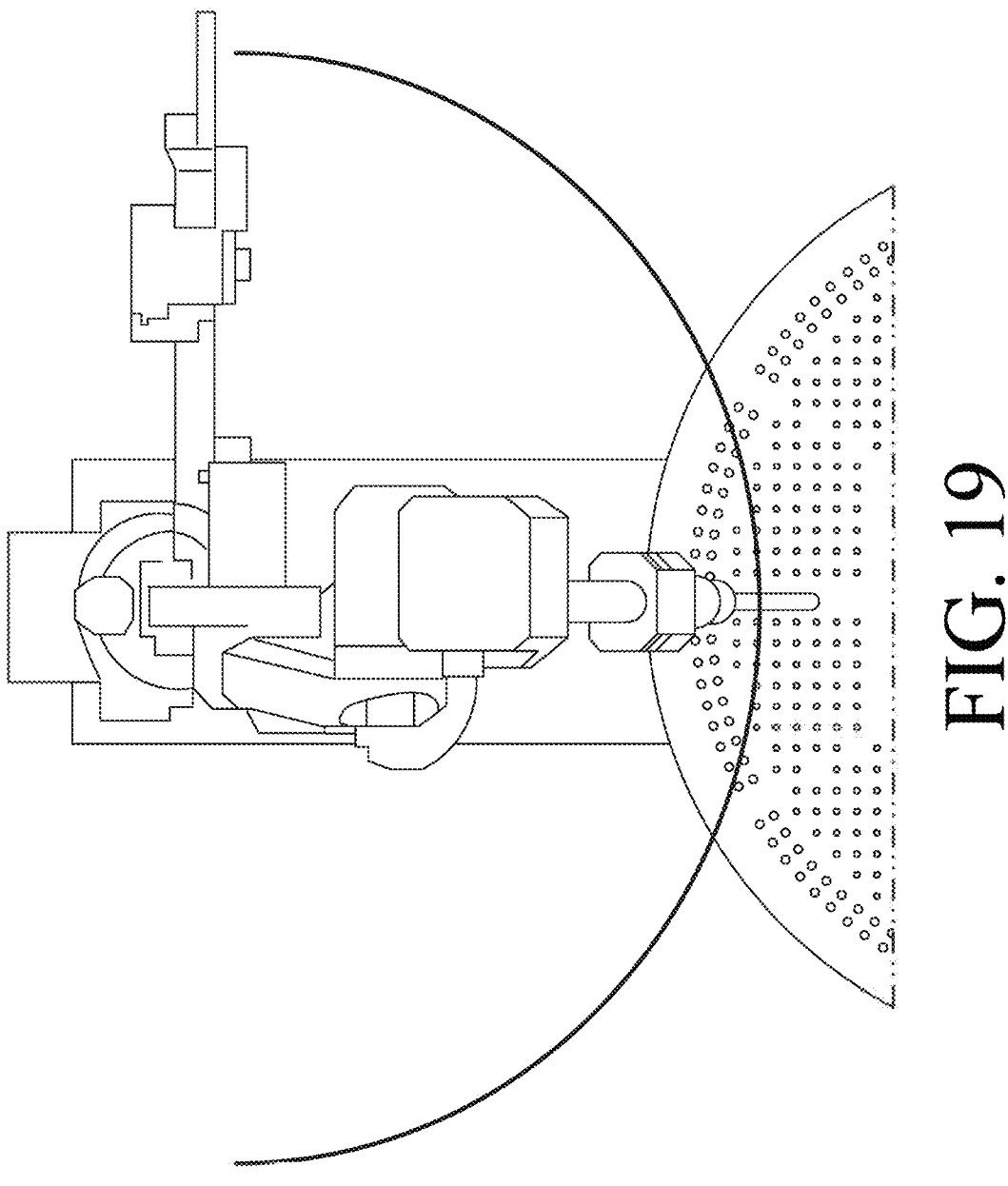
FIG. 19 provides an illustration showing a circle drawn by a robotic arm.

In block 1814, the axis of rotation for another robot is captured by jogging the robot until the Z coordinate (in robot 2 base reference frame) is 0 and the arm is a fair distance away (1.5 m-2 m) from a first joint of the robot. The first joint may be the joint that is furthest from an end effector or distal end of the robot. The jogging was set to joint mode on the pendant and directions on the joystick were locked so that only horizontal movement is possible. This task required two operators-one to jog the robot and the other to rotate the red ring reflector toward the laser tracker. A circle (approximately 180 degrees) was swept with joint 1 of robot 2. Data was recorded in the same way as the workpiece positioner's circle axis of rotation. The circle drawn is shown in FIG. 19. After recording the data, the system collected a 3D Point representing the center of the circle, a normal vector to the workpiece positioner circle, and a diameter measurement.

In block 1816, the collected data is imported into calibration software. The calibration software is configured to reduce the data and output the new base frames of the robots. The calibration software may be provided in Python, Mathematica and/or any other programming language. Next, operations were performed to import the positioner circle, positioner plane, robot 2 circle, and shape data (retrieved by having each robot draw a three-dimensional object or shape in space) into the corresponding cells. The data was saved in this file before running the calibration script.

In block 1818, the calibration software program is run. A main calibration script comprises a central file or program that orchestrates an entire calibration process. For example, the calibration script may embody a program comprising computer executable instructions configured to execute the example methodologies disclosed herein. In some embodiments, the calibration script may include a file with a list of settings. In some embodiments, an output variable may be used to specify the destination of an excel file and a pathway for the calibration reports or results, and an output file name variable may be used to store or dictate the name of a the file where the results or data generated by the calibration process will be saved. The output variable may be set to true if the system is to output an excel file with update base frame values. This option may not be desirable. For example, one can check the error of the current base frame calibration without writing the update base frame values to another spreadsheet. If it is not desirable to output the data, actions may be taken to change the output variable to true and rename the output file name to the desired output file name.

In block 1820, the processor performs operations to change the robot base frames. These operations involved: making a backup of the current robot system; navigating to a motion configuration settings of the robot controller; choosing robot in the motion configuration and import the base frame data from the excel file; and restart the robot controller to apply the new base frame values. The following TABLE 1 shows illustrative base frame values for three articulating robots. It should be noted that x,y,z is translation and q1-q4 is rotation in in quaternion notation. The quaternion order may be (w, qx, qy, qz) some time and other times it may be (qx, qy, qz, w).

TABLE 1

| Robot | Base Frame X | Base Frame Y | Base Frame Z |
|---|---|---|---|
| 1 | 1.12717 | 1.9455 | 0.380294 |
| 2 | −2.24755 | 0.00641487 | 0.377242 |
| 3 | 1.11922 | −1.94637 | 0.376105 |

| | Base Frame q1 | Base Frame q2 | Base Frame q3 |
|---|---|---|---|
| 1 | 0.500002 | 0.00297134 | 0.00159994 |
| 2 | 0.999999 | 0.000467082 | 0.000983489 |
| 3 | 0.499911 | −0.00152303 | 0.000525494 |

TABLE 1-continued

| Base Frame q4 | |
| --- | --- |
| 1 | −0.0866018 |
| 2 | −0.00116146 |
| 3 | 0.866075 |

Figure 20:
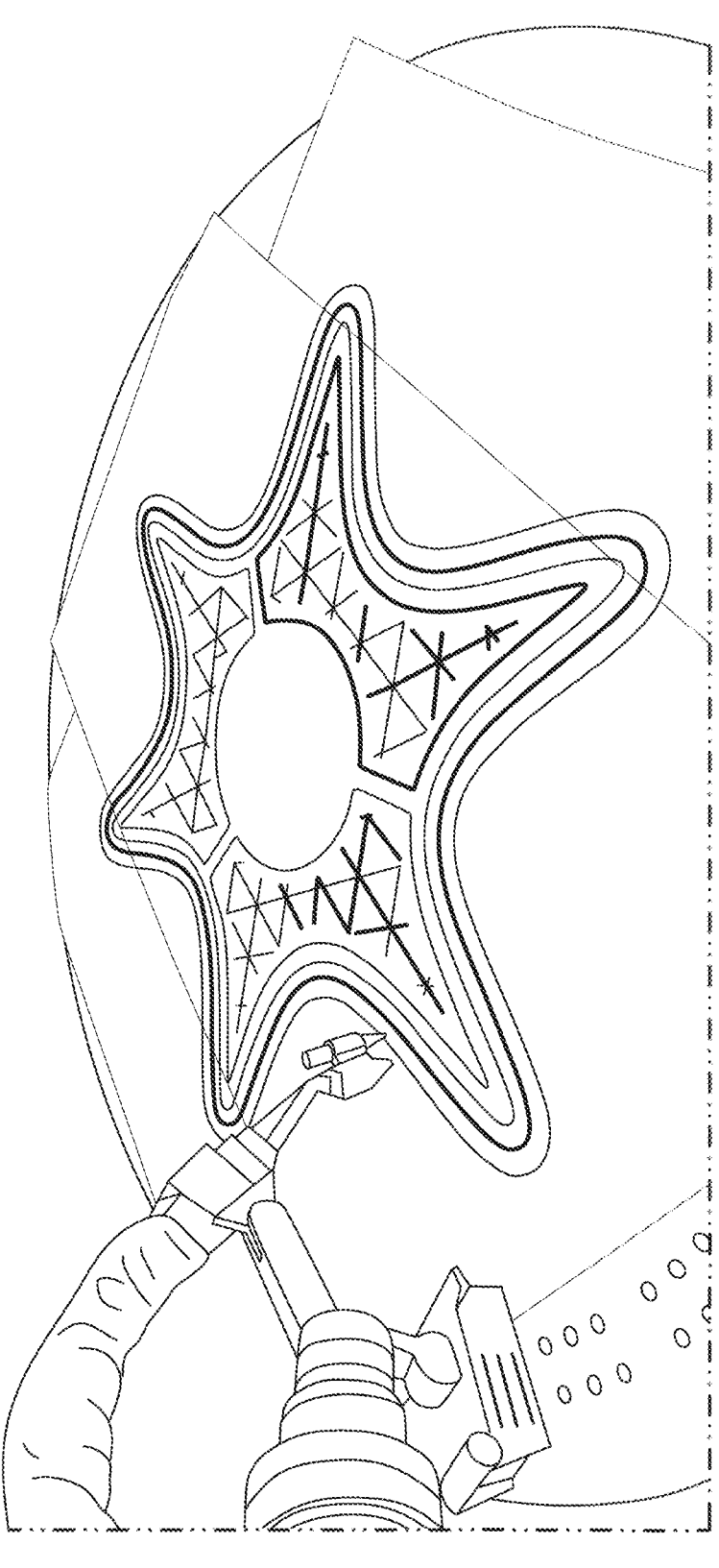
FIG. 20 provides an image of a drawing after calibrating the robotic system.

If a value was entered incorrectly, or if the systems calibration seems incorrect, the system can restore the backup of the robot controller. If the calibration worked correctly, an error margin around 0.05 mm to 0.1 mm should appear in the output window of the calibration software program. An image of a drawing after calibrating the robotic system is shown in FIG. 20. The equally spaced lines indicate that each robot's world origin lies within tolerance to the center of rotation of the table, and the axis of each robot's world origin are colinear.

Subsequently, method 1800 continues to block 1822 where it ends or other operations are performed. The other operations can include, but are not limited to, returning to block 1802 or repeating the operations of blocks 1808-1820.

Figure 21:
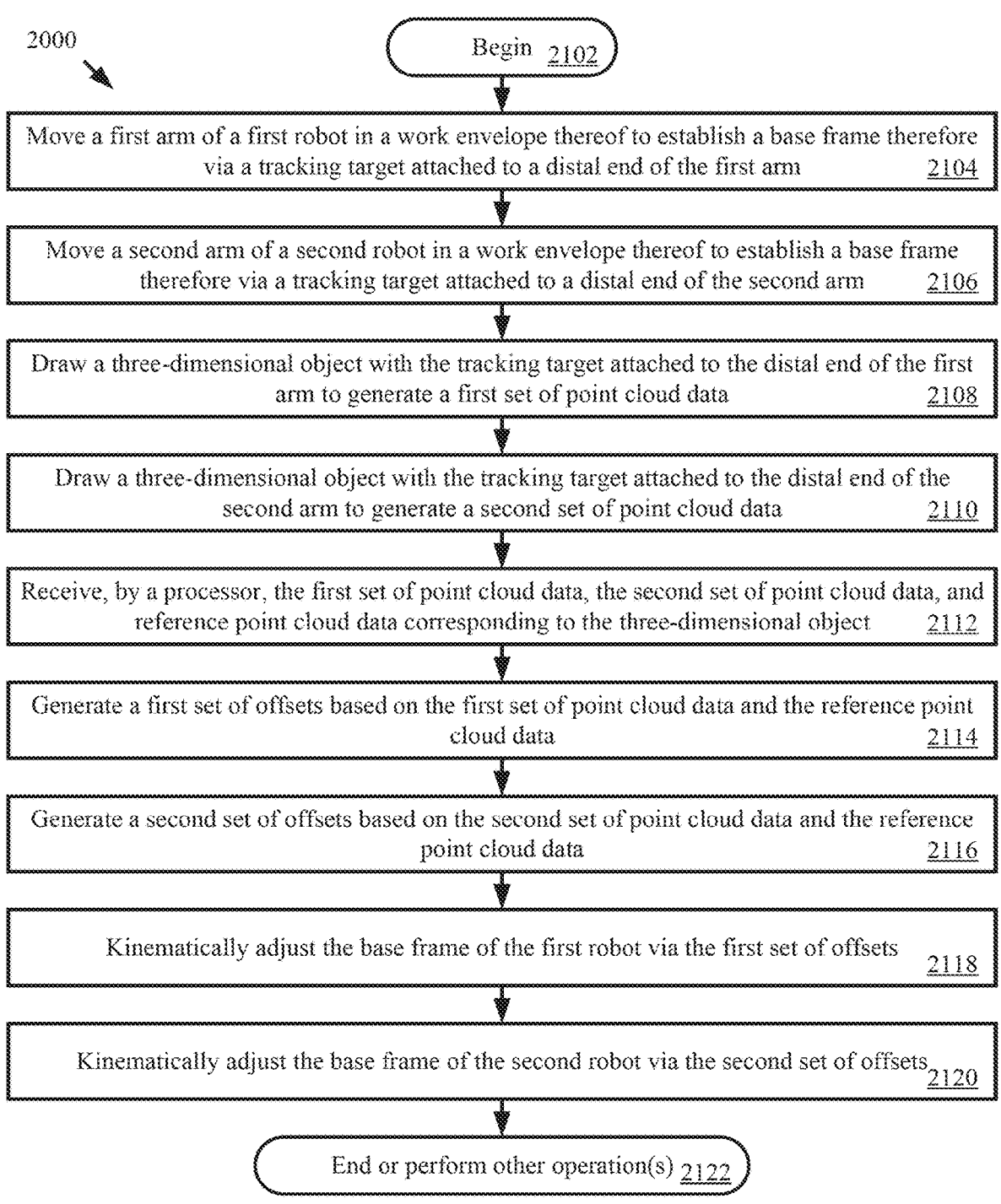

FIG. 21 provides a flow diagram of another method 2100 for calibrating a robotic system (e.g., system 400 of FIG. 4). The manufacturing system can include, but is not limited to, a first robot (e.g., robot 402 of FIG. 4), a second robot (e.g., robot 404 of FIG. 4), and a workpiece positioner (e.g., workpiece positioner 408 of FIG. 4). The workpiece positioner may be centrally located relative to the first and second robots.

Method 2100 may include more or fewer operations than shown. The operations of method 2100 may be performed in the same or different order than that shown. Some or all of the operations of method 2100 may be combined with some or all of the operations of other methods (e.g., methods 1800 of FIGS. 18 and/or 2200 of FIG. 22) discussed herein.

Method 2100 begins at block 2102 and continues to block 2104 where a first arm of the first robot is moved in a work envelope of the first robot to establish a base frame of the first robot via a tracking target (e.g., tracking target 458 of FIG. 4) attached to a distal end of the first arm. The distal end of the first arm can comprise a free end with a welding torch. Next in block 2106, a second arm of the second robot moves in a work envelope thereof to establish a base frame therefore via the tracking target (e.g., tracking target 458 of FIG. 4) attached to the distal end of the second arm. The distal end of the second arm can comprise a free end with a welding torch.

In block 2108, the first robot is controlled to draw a three-dimensional object with the tracking target attached to the distal end of the first arm. A first set of point cloud data is generated through the observation of the three-dimensional object drawn by the first robot. The second robot is controlled in block 2110 to draw the three-dimensional object with the tracking target attached to the distal end of the second arm. A second set of point cloud data is generated through the observation of the drawn three-dimensional object drawn by the second robot.

In 2112, a processor (e.g., main controller 410 of FIG. 4) receives the first set of point cloud data, the second set of point cloud data, and reference point cloud data corresponding to the three-dimensional object. The processor performs operations in blocks 2114-2120 that involve: generating a first set of offsets based on the first set of point cloud data and the reference point cloud data; generating a second set of offsets based on the second set of point cloud data and the reference point cloud data; kinematically adjusting the base frame of the first robot via the first set of offsets; and kinematically adjusting the base frame of the second robot via the second set of offsets.

With regard to the kinematic adjustments to the respective base frames of the one or more robots, the kinematic locations (e.g., base frames thereof) of the robots may be determined and the kinematic location (for example, the work frame thereof) of the positioner may be determined. The processor takes in the current kinematic location data (e.g., pre-existing base frames or work frames) from the controlling computer of the robotic system, the determined kinematic locations of the robots, the determined location of the positioner, and the three-dimensional point cloud data from the calibrated shapes. The current kinematic location data can comprise coordinate values representing a current location of the base frame. The processor calculates the new kinematic location data to input into the computer controlling the robotic system. The new kinematic location data comprises coordinate values of the current kinematic location which have been adjusted by the offset values (e.g., based on point cloud data corresponding to the theoretical shapes drawn relative to reference point cloud data). In some embodiments, the reference point cloud data may be derived from another robot, or based on other reference data (e.g., corresponding to a theoretical 3D shape). This kinematic location data is optimized in the algorithm to minimize error. For example, a least squares approximation is applied to the point cloud data to determine the offsets. The offsets are applied to the current kinematic location to generate the new kinematic location. Least squares approximation is a known optimization algorithm. To further minimize error, the entire kinematic adjustment routine may be run several times. Additionally or alternatively, the processor may perform operations to incrementally apply a differential transformation to adjust each robot's base frame pose (and consequently the pose of each robot's perceived world frame) in a manner that minimizes the least square error between each point clouds drawn by the robots. Differential transformation is a well-known mathematical method. Differential transformation is a mathematical method used to solve differential equations. It involves transforming a differential equation into an algebraic equation in a transform domain. The robot's base frame pose defines a home position and orientation in a global coordinate system. The robot's base frame pose is the starting point for robot movements and calculations. The error minimization calculation step can be accomplished using a number of different algorithms.

Subsequently, method 2100 continues to block 2122 where it ends or other operations are performed. The other operations can include, but are not limited to: repeating the operations of blocks 1208-2120; or repeating the operations of blocks 2112 and 2114 to generate an updated first set of point cloud data and an updated second set of point cloud data; generating an updated first set of offsets based on the updated first set of point cloud data and the reference point cloud data; generating an updated second set of offsets based on the updated second set of point cloud data and the reference point cloud data; determining a margin of error based on the updated first set of offsets and the updated second set of offsets; and comparing the margin of error relative to a threshold value to validate a calibration of said robotic system.

Additionally or alternatively, the other operations can include: rotating the positioner with the tracking target affixed thereon to determine an axis of rotation of the positioner; sweeping the surface of the positioner via the tracking target to determine a plane of the positioner;

drawing a circle in a two-dimensional plane via the tracking target with one of said first and second robot arms to determine a robot axis of rotation; and receiving, via the processor, the axis of rotation of the positioner, the plane of the positioner, and the robot axis of rotation. To measure the center of rotation of the positioner, the system rotates a tracking target that is mounted to the positioner table. The laser tracker looks for a circle and defines the equation of that circle. The collected data is compared to the internal existing data and the algorithm will compare these locations and calculate how to adjust the internal existing data such that it aligns with the collected data. The internal existing data comprises, but is not limited to, first current location data (e.g., base line factory calibration values for the location of each robot). The internal existing data may be stored in a datastore of the main controller 410.

FIG. 22 provides a flow diagram of another method 2200 for calibrating a robotic system (e.g., system 400 of FIG. 2) including at least a first robot (e.g., robot 402 of FIG. 2) and a second robot (e.g., robot 404 of FIG. 4). Method 2200 can include more or less operations than those shown. The operations of method 2200 may be performed in the same or different order than that shown. Some or all of the operations of method 2200 may be combined with some or all of the operations of methods 1600, 1800, 2100 discussed above.

Method 2200 begins at block 2202 and continues with the operations of blocks 2204-2216. The operations of blocks 2204-2216 involve: drawing a three-dimensional object with a tracking target attached to an arm of the first robot to generate a first set of point cloud data; drawing the three-dimensional object with the tracking target attached to an arm of the second robot to generate a second set of point cloud data; receiving the first set of point cloud data, the second set of point cloud data, and reference point cloud data corresponding to the three-dimensional object; generating a first set of offsets, based on the first set of point cloud data and the reference point cloud data; generating a second set of offsets based on the second set of point cloud data and the reference point cloud data; kinematically adjusting a base frame of the first robot via the first set of offsets; and kinematically adjusting a base frame of the second robot via the second set of offsets.

The operations of block 2204 and 2206 may be repeated in block 2218 to generate an updated first set of point cloud data and an updated second set of point cloud data. An updated first set of offsets is generated in block 2220 based on the updated first set of point cloud data and the reference point cloud data. An updated second set of offsets is generated in block 2222 based on the updated second set of point cloud data and the reference point cloud data. Upon completing the operations of block 2222, method 2200 continues to block 2224 of FIG. 22B.

As shown in FIG. 22B, block 2224 involves determining a margin of error based on the updated first set of offsets and the updated second set of offsets. Kinematic calibration of the first and second robots is validated in block 2226 based on the margin of error relative to a threshold value.

Method 2200 may then continue with the operations of blocks 2228-2236. These operations involve: rotating the positioner with the tracking target affixed thereon to generate a third set of point cloud data; determining an actual axis of rotation of the positioner based on the third set of point cloud data; receiving a perceived axis of rotation of the positioner from the first or second robot; generating a third set of offsets based on the actual axis of rotation of the positioner and the perceived axis of rotation of the positioner; and kinematically adjusting the perceived axis of rotation of the first or second robot based on the third set of offsets.

Method 2200 may then continue with the operations of blocks 2238-2240 of FIG. 22B and blocks 2242-2246 of FIG. 22C. These operations involve: sweeping the surface of the positioner via the tracking target to generate a fourth set of point cloud data; determining an actual surface plane of the positioner based on the fourth set of point cloud data; receiving a perceived plane of the positioner; generating a fourth set of offsets based on the actual plane and the perceived plane; and kinematically adjusting the perceived plane of the positioner of the first or second robot based on the fourth set of offsets.

Method 2200 may then continue with the operations of blocks 2248-2256. These operations involve: at least partially drawing a circle in a two-dimensional plane via the tracking target attached to the arm of the first or second robot to generate a fifth set of point cloud data; determining an actual axis of rotation of the first or second robot based on the fifth set of point cloud data; receiving a perceived axis of rotation of the first or second robot from the internal existing data; generating a fifth set of offsets based on the actual rotation of the first or second robot and the perceived axis of rotation of the first or second robot; and kinematically adjusting the perceived axis of rotation of the first or second robot based on the fifth set of offsets.

Subsequently, method 2200 continues to block 2258 where it ends or other operations are performed. For example, method 2200 may return to block 2202 of FIG. 22A.

Figure 23:
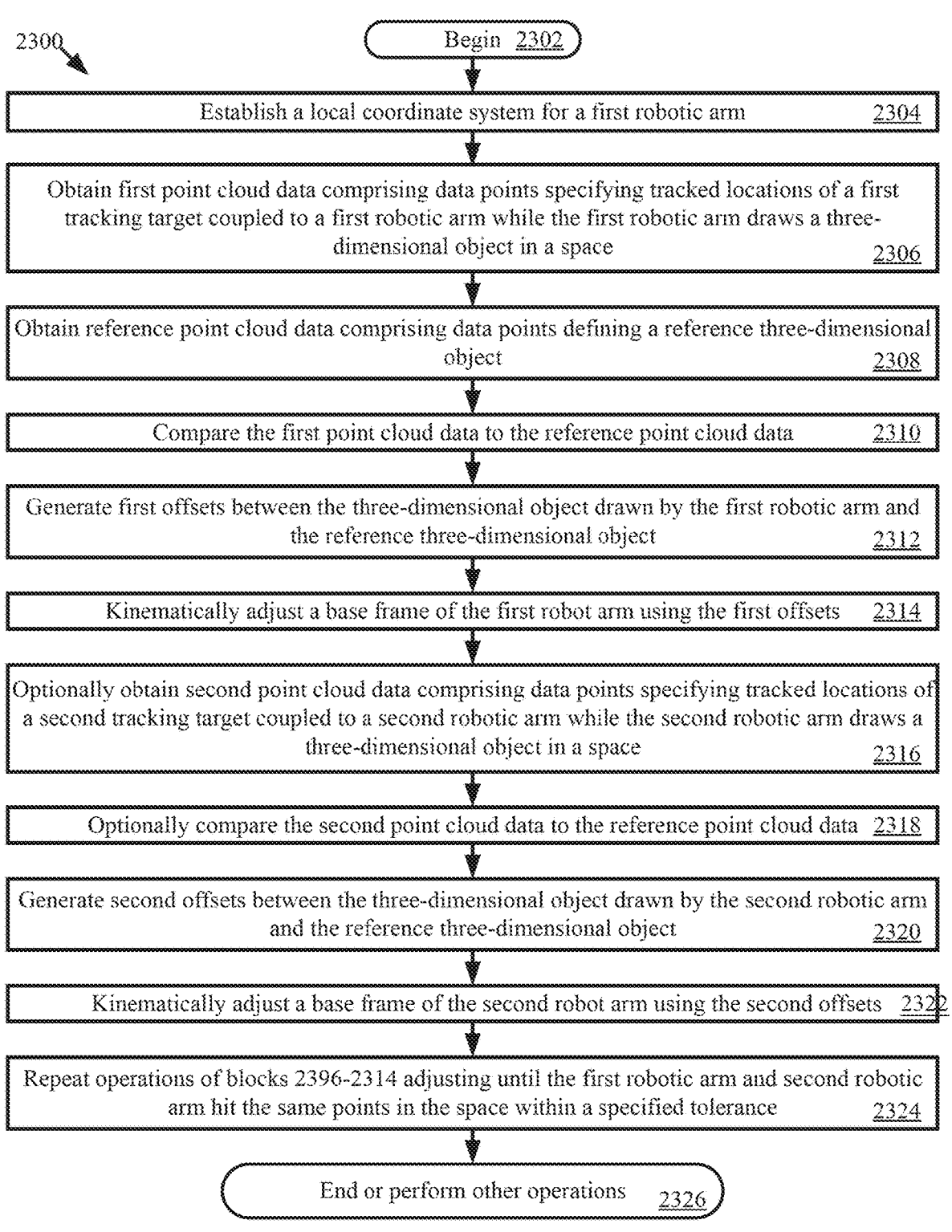

FIG. 23 provides a block diagram of an illustrative method 2300 for calibrating a robotic system (e.g., system 400 of FIG. 4). Method 2300 may include more or less operations than that shown in FIG. 23. The operations of method 2300 may be performed in the same or different order than that shown. Method 2300 may be performed by a processor (e.g., controller 410, 414, 416, 418, and/or 450 of FIG. 4), a computing device (e.g., computing device 2400 of FIG. 24), and/or other circuit. Method 2300 will be discussed below in relation to the processor for case of illustration, but the present solution is not limited in this regard.

Method 2300 begins at block 2302 and continues to block 2304 where the processor establishes a local coordinate system for the first robotic arm (e.g., articulated arm 402 of FIG. 4). This can be achieved by: moving the first robotic arm to various positions in the space; and tracking the first tracking target (e.g., tracking target 458 of FIG. 4) coupled to derive where x, y and z axes lie for the first robotic arm and/or to understand a roll, a pitch and a yaw of the first robotic arm. This local coordinate system may be as defined the base frame for the first robotic arm.

In block 2306, the processor obtains first point cloud data comprising data points specifying tracked locations of a first tracking target (e.g., tracking target 458 of FIG. 4) coupled to a first robotic arm (e.g., articulated arm 402 of FIG. 4) while the first robotic arm draws a three-dimensional object in a space. The processor also obtains reference point cloud data comprising data points defining a reference three-dimensional object, as shown by block 2308. In some scenarios, the reference point cloud data can include, but is not limited to, data points specifying tracked locations of a second tracking target (e.g., tracking target 458 of FIG. 4) coupled to a second robotic arm (e.g., articulated arm 404 or 406 of FIG. 4) while the second robotic arm draws a three-dimensional object in a space.

In block 2310, the processor compares the first point cloud data to the reference point cloud data. Based on the comparing operation of block 2310, the processor generates in block 2312 first offsets between the three-dimensional object drawn by the first robotic arm and the reference three-dimensional object. Block 2310 can involve obtaining additional data specifying a spatial relationship between the first robot arm and a workpiece positioner, and/or a center of rotation of a workpiece positioner table used to support a workpiece for the robotic system. The additional data may be obtained by: obtaining second point cloud data comprising data points specifying one or more tracked locations of a second tracking target coupled to the workpiece positioner table; and analyzing the second point cloud data to determine a center, a perimeter, at least one axes of linear movement, and/or an axis of rotation in a least one rotational direction of the workpiece positioner table. Additionally and/or alternatively, the additional data is obtained by: obtaining third point cloud data comprising data points specifying tracked locations of the first tracking target as the first robotic arm is moved in a manner to sweep an upper surface of the workpiece positioner table with the first tracking target; and analyzing the third point cloud data to determine a plane of the workpiece positioner table. The first offsets may be generated further based on the additional data.

Next in block 2314, the processor performs operations to kinematically adjust the base frame of the first robot arm using the first offsets. The kinematic adjustment of the base frame of the first robot arm may include modifying the local coordinate system by defining a location of a new origin having different x, y and z coordinates and/or defining a new orientation for the base frame.

Method 2300 may optionally include the operations of blocks 2316-2322. These operations involve: obtaining second point cloud data comprising data points specifying tracked locations of a second tracking target coupled to a second robotic arm while the second robotic arm draws a three-dimensional object in a space; comparing the second point cloud data to the reference point cloud data; generating second offsets between the three-dimensional object drawn by the second robotic arm and the reference three-dimensional object based on said comparing; and kinematically adjusting a base frame of the second robot arm using the second offsets.

In block 2324, the processor repeats (e.g., iteratively) the operations of blocks 2306-2314 and/or 2316-2322 to improve the accuracy of the adjustments to the base frame(s). For example, the operations of blocks 2306-2322 may be repeated until the first and second robotic arms hit the same points in the space within a specified tolerance. Subsequently, method 2300 continues to block 2326 where it ends or other operations are performed. The other operations can include, but are not limited, to repeating the operations of blocks 2306-2322.

Figure 24:
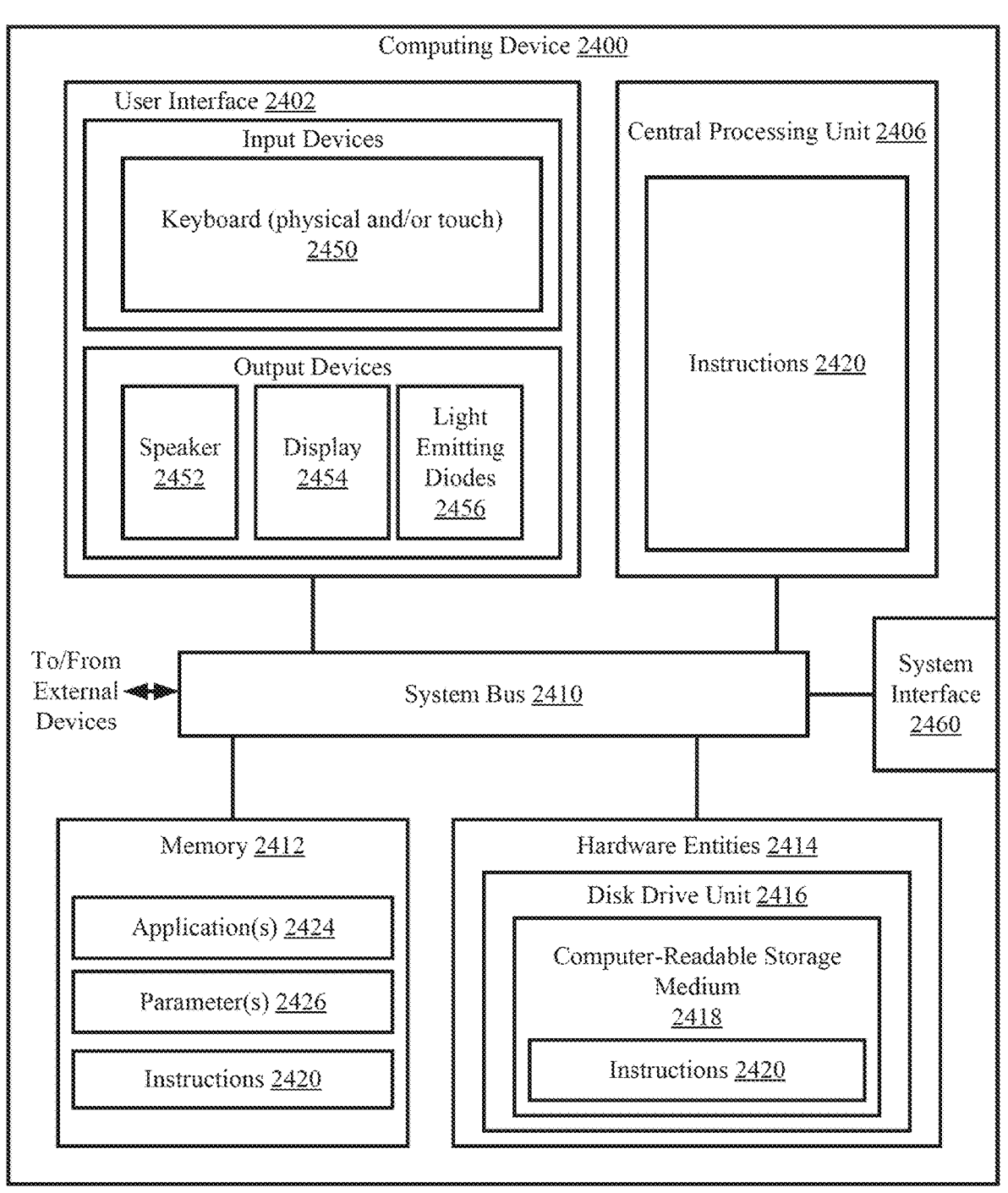
FIG. 24 provides a block diagram of an illustrative architecture for a computing device.

Referring now to FIG. 24, there is shown an illustrative architecture for a computing device 2400. The controller(s) 410, 414, 416, 418, 450 of FIG. 4, laser tracker 430, and/or computing device 486 of FIG. 4 is/are the same as or similar to computing device 2400. As such, the discussion of computing device 2400 is sufficient for understanding the components 410, 414, 416, 418, 450, 486 of FIG. 4.

Computing device 2400 may include more or less components than those shown in FIG. 24. However, the components shown are sufficient to disclose an illustrative solution implementing the present solution. The hardware architecture of FIG. 24 represents one implementation of a representative computing device configured to receive information, process the receive information, transmit information and/or control operations of one or more robots, as described herein. As such, the computing device 2400 of FIG. 24 implements at least a portion of the method(s) described herein.

Some or all components of the computing device 2400 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 24, the computing device 2400 comprises a user interface 2402, a Central Processing Unit (CPU) 2406, a system bus 2410, a memory 2412 connected to and accessible by other portions of computing device 2400 through system bus 2410, a system interface 2460, and hardware entities 2414 connected to system bus 2410. The user interface can include input devices and output devices, which facilitate user-software interactions for controlling operations of the computing device 2400. The input devices include, but are not limited to, a physical and/or touch keyboard 2450. The input devices can be connected to the computing device 2400 via a wired or wireless connection (e.g., a Bluetooth® connection). The output devices include, but are not limited to, a speaker 2452, a display 2454, and/or light emitting diodes 2456. System interface 2460 is configured to facilitate wired or wireless communications to and from external devices (e.g., network nodes such as access points, etc.).

At least some of the hardware entities 2414 perform actions involving access to and use of memory 2412, which can be a Random Access Memory (RAM), a disk drive, flash memory, a universal serial bus (USB) drive and/or another hardware device that is capable of storing instructions and data. Hardware entities 2414 can include a disk drive unit 2416 comprising a computer-readable storage medium 2418 on which is stored one or more sets of instructions 2420 (e.g., software code) configured to implement one or more of the methodologies, procedures, or functions described herein. Instructions 2420 can also reside, completely or at least partially, within the memory 2412 and/or within the CPU 2406 during execution thereof by the computing device 2400. The memory 2412 and the CPU 2406 also can constitute machine-readable media. The term "machine-readable media", as used here, refers to a single medium or multiple media (e.g., a centralized or distributed database, and/or associated caches and servers) that store the one or more sets of instructions 2420. The term "machine-readable media", as used here, also refers to any medium that is capable of storing, encoding or carrying a set of instructions 2420 for execution by the computing device 2400 and that cause the computing device 2400 to perform any one or more of the methodologies of the present disclosure.

As evident from the above discussion the present solution concerns implementing systems and methods for calibrating a robotic system including one or more robots. In some scenarios, the robotic system comprises a wire-arc additive manufacturing system including at least a first robot and a second robot. The present solution is not limited in this regard. The methods comprise: (a) drawing a three-dimensional object with a tracking target attached to a distal end of the first robot to generate a first set of point cloud data; (b) drawing the three-dimensional object with the tracking target attached to a distal end of the second robot to generate a second set of point cloud data; (c) receiving the first set of point cloud data, the second set of point cloud data, and reference point cloud data corresponding to the three-dimensional object; (d) generating a first set of offsets, based on the first set of point cloud data and the reference point cloud data; (e) generating a second set of offsets based on the second set of point cloud data and the reference point cloud data; (f) kinematically adjusting a base frame of the first robot via the first set of offsets; and (g) kinematically adjusting a base frame of the second robot via the second set of offsets.

The methods may also comprises: repeating steps (a) and (b) of claim 1 to generate an updated first set of point cloud data and an updated second set of point cloud data; generating an updated first set of offsets based on the updated first set of point cloud data and the reference point cloud data; generating an updated second set of offsets based on the updated second set of point cloud data and the reference point cloud data; determining a margin of error based on the updated first set of offsets and the updated second set of offsets; and validating a kinematic calibration of said first and second robots based on said margin of error relative to a threshold value.

Additionally or alternatively, the methods may comprise: rotating the positioner with the tracking target affixed thereon to generate a third set of point cloud data; determining an actual axis of rotation of the positioner based on the third set of point cloud data; receiving a perceived axis of rotation of the positioner from the first or second robot; generating a third set of offsets based on the actual axis of rotation of the positioner and the perceived axis of rotation of the positioner; and kinematically adjusting the perceived axis of rotation of the first or second robot based on the third set of offsets.

Additionally or alternatively, the method may comprise: sweeping the surface of the positioner via the tracking target to generate a fourth set of point cloud data; determining an actual surface plane of the positioner based on the fourth set of point cloud data; receiving a perceived plane of the positioner; generating a fourth set of offsets based on the actual plane and the perceived plane; and kinematically adjusting the perceived plane of the positioner of the first or second robot based on the fourth set of offsets.

Additionally or alternatively, the method may comprise: at least partially drawing a circle in a two-dimensional plane via the tracking target attached to the distal end of the first or second robot to generate a fifth set of point cloud data; determining an actual axis of rotation of the first or second robot based on the fifth set of point cloud data; receiving a perceived axis of rotation of the first or second robot; generating a fifth set of offsets based on the actual rotation of the first or second robot and the perceived axis of rotation of the first or second robot; and kinematically adjusting the perceived axis of rotation of the first or second robot based on the fifth set of offsets.

Step (f) or (g) may comprise incrementally applying a differential transformation to adjust a base frame pose of the first or second robot in a manner that minimizes a least square error between points in the first and second set of point cloud data.

The present solution also concerns implementing systems and methods for calibrating a robotic system. The methods comprise: obtaining, by a processor, (1) first point cloud data comprising data points specifying tracked locations of a first tracking target coupled to a first robotic arm while the first robotic arm draws a three-dimensional object in a space, and (2) reference point cloud data comprising data points defining a reference three-dimensional object; comparing, by the processor, the first point cloud data to the reference point cloud data; generating, by the processor, first offsets between the three-dimensional object drawn by the first robotic arm and the reference three-dimensional object based on said comparing; kinematically adjusting a base frame of the first robot using the first offsets; and/or repeating said obtaining, comparing, generating and kinematically adjusting until the first robotic arm and a second robotic arm hit the same points in the space within a specified tolerance.

The reference point cloud data may comprise data points specifying tracked locations of a second tracking target coupled to a second robotic arm while the second robotic arm draws a three-dimensional object in a space. The methods may also comprise establishing a local coordinate system for the first robotic arm by: moving the first robotic arm to various positions in the space; and tracking the first tracking target to derive where x, y and z axes lie for the first robotic arm and/or to understand a roll, a pitch and a yaw of the first robotic arm. The kinematically adjusting a base frame of the first robot may comprise modifying the local coordinate system by defining a location of a new origin having different x, y and z coordinates and/or defining a new orientation for the base frame.

Additionally or alternatively, the methods may comprise obtaining additional data specifying a spatial relationship between the first robot and a workpiece positioner, and/or a center of rotation of a workpiece positioner table used to support a workpiece for the robotic system. The additional data may be obtained by: obtaining second point cloud data comprising data points specifying one or more tracked locations of a second tracking target coupled to the workpiece positioner table; and analyzing the second point cloud data to determine a center, a perimeter, at least one axes of linear movement, and/or an axis of rotation in a least one rotational direction of the workpiece positioner table. The additional data may be obtained by: obtaining third point cloud data comprising data points specifying tracked locations of the first tracking target as the first robotic arm is moved in a manner to sweep an upper surface of the workpiece positioner table with the first tracking target; and analyzing the third point cloud data to determine a plane of the workpiece positioner table. The generation of the first offsets may be further based on the additional data.

Additionally or alternatively, the methods may comprise: obtaining, by a processor, second point cloud data comprising data points specifying tracked locations of a second tracking target coupled to a second robotic arm while the second robotic arm draws a three-dimensional object in a space; comparing, by the processor, the second point cloud data to the reference point cloud data; generating, by the processor, second offsets between the three-dimensional object drawn by the second robotic arm and the reference three-dimensional object based on said comparing; kinematically adjusting a base frame of the second robot using the second offsets; and/or repeating kinematic adjustments of the base frame for the first robotic arm and the base from for the second robotic arm until the first and second robotic arms hit the same points in the space within a specified tolerance.

The present solution also concerns a system for calibrating a robotic system. The system comprises: a processor; and a non-transitory computer readable medium comprising one or more programming instructions that when executed by the processor, cause the processor to: obtain (1) first point cloud data comprising data points specifying tracked locations of a first tracking target coupled to a first robotic arm while the first robotic arm draws a three-dimensional object in a space, and (2) reference point cloud data comprising data points defining a reference three-dimensional object; compare the first point cloud data to the reference point cloud data; generate first offsets between the three-dimensional object drawn by the first robotic arm and the reference three-dimensional object based on said comparing; and kinematically adjust a base frame of the first robot using the first offsets.

The reference point cloud data may comprise data points specifying tracked locations of a second tracking target coupled to a second robotic arm while the second robotic arm draws a three-dimensional object in a space. The processor may also be caused to establish a local coordinate system for the first robotic arm by: moving the first robotic arm to various positions in the space; and tracking the first tracking target to derive where x, y and z axes lie for the first robotic arm and/or to understand a roll, a pitch and a yaw of the first robotic arm. The base frame of the first robotic arm may be kinematically adjusted by modifying the local coordinate system by defining a location of a new origin having different x, y and z coordinates and/or defining a new orientation for the base frame. A calibration process including kinematically adjusting the base frame may be repeated until the first robotic arm and a second robotic arm hit the same points in the space within a specified tolerance.

Additionally or alternatively, the processor may be caused to obtain additional data specifying a spatial relationship between the first robot and a workpiece positioner, and/or a center of rotation of a workpiece positioner table used to support a workpiece for the robotic system. The additional data may be obtained by: obtaining second point cloud data comprising data points specifying one or more tracked locations of a second tracking target coupled to the workpiece positioner table; and analyzing the second point cloud data to determine a center, a perimeter, at least one axes of linear movement, and/or an axis of rotation in a least one rotational direction of the workpiece positioner table. The additional data may be obtained by: obtaining third point cloud data comprising data points specifying tracked locations of the first tracking target as the first robotic arm is moved in a manner to sweep an upper surface of the workpiece positioner table with the first tracking target; and analyzing the third point cloud data to determine a plane of the workpiece positioner table. The generation of the first offsets may be further based on the additional data.

Additionally or alternatively, the processor is further caused to: obtain second point cloud data comprising data points specifying tracked locations of a second tracking target coupled to a second robotic arm while the second robotic arm draws a three-dimensional object in a space; compare the second point cloud data to the reference point cloud data; generate second offsets between the three-dimensional object drawn by the second robotic arm and the reference three-dimensional object based on said comparing; kinematically adjust a base frame of the second robot using the second offsets; and/or repeat kinematic adjustments of the base frame for the first robotic arm and the base from for the second robotic arm until the first and second robotic arms hit the same points in the space within a specified tolerance.

The terms "processor" and "processing device" refer to a hardware component of an electronic device that is configured to execute programming instructions. Except where specifically stated otherwise, the singular terms "processor" and "processing device" are intended to include both single-processing device embodiments and embodiments in which multiple processing devices together or collectively perform a process.

The terms "memory," "memory device," "computer-readable medium," "data store," "data storage facility" and the like each refer to a non-transitory device on which computer-readable data, programming instructions or both are stored. Except where specifically stated otherwise, the terms "memory," "memory device," "computer-readable medium," "data store," "data storage facility" and the like are intended to include single device embodiments, embodiments in which multiple memory devices together or collectively store a set of data or instructions, as well as individual sectors within such devices. A computer program product is a memory device with programming instructions stored on it.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

The described features, advantages and characteristics disclosed herein may be combined in any suitable manner. One skilled in the relevant art will recognize, in light of the description herein, that the disclosed systems and/or methods can be practiced without one or more of the specific features. In other instances, additional features and advantages may be recognized in certain scenarios that may not be present in all instances.

Although the systems and methods have been illustrated and described with respect to one or more implementations, equivalent alterations and modifications will occur to others skilled in the art upon the reading and understanding of this specification and the annexed drawings. In addition, while a particular feature may have been disclosed with respect to only one of several implementations, such feature may be combined with one or more other features of the other implementations as may be desired and advantageous for any given or particular application. Thus, the breadth and scope of the disclosure herein should not be limited by any of the above descriptions. Rather, the scope of the invention should be defined in accordance with the following claims and their equivalents.

What is claimed is:

1. A method for calibrating a robotic system including at least a first robot and a second robot, the method comprising:
  (a) drawing a three-dimensional object with a tracking target attached to a distal end of the first robot to generate a first set of point cloud data;
  (b) drawing the three-dimensional object with the tracking target attached to a distal end of the second robot to generate a second set of point cloud data;
  (c) receiving the first set of point cloud data, the second set of point cloud data, and reference point cloud data corresponding to the three-dimensional object;
  (d) generating a first set of offsets, based on the first set of point cloud data and the reference point cloud data;
  (e) generating a second set of offsets based on the second set of point cloud data and the reference point cloud data;
  (f) kinematically adjusting a base frame of the first robot via the first set of offsets; and (g) kinematically adjusting a base frame of the second robot via the second set of offsets;

wherein step (f) or (g) comprises incrementally applying a differential transformation to adjust a base frame pose of the first or second robot in a manner that minimizes a least square error between points in the first and second set of point cloud data.

2. The method of claim 1, wherein the method further comprises:

repeating steps (a) and (b) of claim 1 to generate an updated first set of point cloud data and an updated second set of point cloud data;

generating an updated first set of offsets based on the updated first set of point cloud data and the reference point cloud data;

generating an updated second set of offsets based on the updated second set of point cloud data and the reference point cloud data;

determining a margin of error based on the updated first set of offsets and the updated second set of offsets; and validating a kinematic calibration of said first and second robots based on said margin of error relative to a threshold value.

3. The method of claim 1, wherein the method further comprises:

sweeping the surface of the positioner via the tracking target to generate a fourth set of point cloud data;

determining an actual surface plane of the positioner based on the fourth set of point cloud data;

receiving a perceived plane of the positioner for the first or second robot;

generating a fourth set of offsets based on the actual plane and the perceived plane; and kinematically adjusting the perceived plane of the positioner for the first or second robot based on the fourth set of offsets.

4. The method of claim 1, wherein the method further comprises:

at least partially drawing a circle in a two-dimensional plane via the tracking target attached to the distal end of the first or second robot to generate a fifth set of point cloud data;

determining an actual axis of rotation of the first or second robot based on the fifth set of point cloud data;

receiving a perceived axis of rotation of the first or second robot from a main controller;

generating a fifth set of offsets based on the actual rotation of the first or second robot and the perceived axis of rotation of the first or second robot; and kinematically adjusting the perceived axis of rotation of the first or second robot based on the fifth set of offsets.

5. A method for calibrating a robotic system including at least a first robot and a second robot, the method comprising:

(a) drawing a three-dimensional object with a tracking target attached to a distal end of the first robot to generate a first set of point cloud data;

(b) drawing the three-dimensional object with the tracking target attached to a distal end of the second robot to generate a second set of point cloud data;

(c) receiving the first set of point cloud data, the second set of point cloud data, and reference point cloud data corresponding to the three-dimensional object;

(d) generating a first set of offsets, based on the first set of point cloud data and the reference point cloud data;

(e) generating a second set of offsets based on the second set of point cloud data and the reference point cloud data;

(f) kinematically adjusting a base frame of the first robot via the first set of offsets; and (g) kinematically adjusting a base frame of the second robot via the second set of offsets;

wherein the method further comprises:

rotating the positioner with the tracking target affixed thereon to generate a third set of point cloud data;

determining an actual axis of rotation of the positioner based on the third set of point cloud data;

receiving a perceived axis of rotation of the positioner from the first or second robot;

generating a third set of offsets based on the actual axis of rotation of the positioner and the perceived axis of rotation of the positioner; and kinematically adjusting the perceived axis of rotation of the positioner for the first or second robot based on the third set of offsets.

6. The method according to claim 5, wherein step (f) or (g) comprises incrementally applying a differential transformation to adjust a base frame pose of the first or second robot in a manner that minimizes a least square error between points in the first and second set of point cloud data.

7. A method for calibrating a robotic system, comprising:

obtaining, by a processor, (1) first point cloud data comprising data points specifying tracked locations of a first tracking target coupled to a first robotic arm while the first robotic arm draws a three-dimensional object in a space, and (2) reference point cloud data comprising data points defining a reference three-dimensional object;

comparing, by the processor, the first point cloud data to the reference point cloud data;

generating, by the processor, first offsets between the three-dimensional object drawn by the first robotic arm and the reference three-dimensional object based on said comparing; and kinematically adjusting a base frame of the first robot using the first offsets;

wherein the reference point cloud data comprises data points specifying tracked locations of a tracking target corresponding to a three-dimensional object drawn in space.

8. The method according to claim 7, further comprising repeating said obtaining, comparing, generating and kinematically adjusting until the first robotic arm and a second robotic arm hit the same points in the space within a specified tolerance.

9. The method according to claim 7, further comprising obtaining additional data specifying a spatial relationship between the first robot and a workpiece positioner, or a center of rotation of a workpiece positioner table used to support a workpiece for the robotic system.

10. The method according to claim 9, wherein the additional data is obtained by:

obtaining second point cloud data comprising data points specifying one or more tracked locations of a second tracking target coupled to the workpiece positioner table; and analyzing the second point cloud data to determine a center, a perimeter, at least one axes of linear movement, or an axis of rotation in a least one rotational direction of the workpiece positioner table.

11. The method according to claim 9, wherein the additional data is obtained by:

obtaining third point cloud data comprising data points specifying tracked locations of the first tracking target as the first robotic arm is moved in a manner to sweep an upper surface of the workpiece positioner table with the first tracking target; and analyzing the third point cloud data to determine a plane of the workpiece positioner table.

12. The method according to claim 9, wherein said generating first offsets is further based on the additional data.

13. The method according to claim 7, further comprising:

obtaining, by a processor, second point cloud data comprising data points specifying tracked locations of a second tracking target coupled to a second robotic arm while the second robotic arm draws a three-dimensional object in a space;

comparing, by the processor, the second point cloud data to the reference point cloud data;

generating, by the processor, second offsets between the three-dimensional object drawn by the second robotic arm and the reference three-dimensional object based on said comparing; and kinematically adjusting a base frame of the second robot using the second offsets.

14. The method according to claim 13, further comprising repeating kinematic adjustments of the base frame for the first robotic arm and the base frame for the second robotic arm until the first and second robotic arms hit the same points in the space within a specified tolerance.

15. A method for calibrating a robotic system, comprising:

obtaining, by a processor, (1) first point cloud data comprising data points specifying tracked locations of a first tracking target coupled to a first robotic arm while the first robotic arm draws a three-dimensional object in a space, and (2) reference point cloud data comprising data points defining a reference three-dimensional object;

comparing, by the processor, the first point cloud data to the reference point cloud data;

generating, by the processor, first offsets between the three-dimensional object drawn by the first robotic arm and the reference three-dimensional object based on said comparing; and kinematically adjusting a base frame of the first robot using the first offsets;

establishing a local coordinate system for the first robotic arm by:

moving the first robotic arm to various positions in the space; and tracking the first tracking target to derive where x, y and z axes lie for the first robotic arm or to understand a roll, a pitch and a yaw of the first robotic arm.

16. The method according to claim 15, wherein the kinematically adjusting the base frame of the first robot comprises modifying the local coordinate system by defining a location of a new origin of the first robot by changing the x, y and z coordinates of the local coordinate system and defining a new orientation for the base frame by changing an orientation value of the base frame.

17. A system for calibrating a robotic system, comprising:

a processor; and a non-transitory computer readable medium comprising one or more programming instructions that when executed by the processor, cause the processor to:

obtain (1) first point cloud data comprising data points specifying tracked locations of a first tracking target coupled to a first robotic arm while the first robotic arm draws a three-dimensional object in a space, and (2) reference point cloud data comprising data points defining a reference three-dimensional object;

compare the first point cloud data to the reference point cloud data to generate first offsets; and kinematically adjusting a base frame of the first robot using the first offsets;

wherein the reference point cloud data comprises data points specifying tracked locations of a tracking target corresponding to a three-dimensional object drawn in space.

18. The system according to claim 17, wherein a calibration process including kinematically adjusting the base frame is repeated until the first robotic arm and a second robotic arm hit the same points in the space within a specified tolerance.

19. The system according to claim 17, wherein the processor is configured to obtain, from the main controller, additional data specifying a spatial relationship between the first robot and a workpiece positioner, or a center of rotation of a workpiece positioner table used to support a workpiece for the robotic system.

20. The system according to claim 19, wherein the additional data is obtained by:

obtaining second point cloud data comprising data points specifying one or more tracked locations of a second tracking target coupled to the workpiece positioner table; and analyzing the second point cloud data to determine a center, a perimeter, at least one axes of linear movement, or an axis of rotation in a least one rotational direction of the workpiece positioner table.

21. The system according to claim 19, wherein the additional data is obtained by:

obtaining third point cloud data comprising data points specifying tracked locations of the first tracking target as the first robotic arm is moved in a manner to sweep an upper surface of the workpiece positioner table with the first tracking target; and analyzing the third point cloud data to determine a plane of the workpiece positioner table.

22. The system according to claim 19, wherein said generating first offsets is further based on the additional data.

23. The system according to claim 17, wherein the processor is configured to:

obtain second point cloud data comprising data points specifying tracked locations of a second tracking target coupled to a second robotic arm while the second robotic arm draws a three-dimensional object in a space;

compare the second point cloud data to the reference point cloud data to generate second offsets; and kinematically adjust a base frame of the second robot using the second offsets.

24. The system according to claim 23, wherein the processor is configured to repeat kinematic adjustments of the base frame for the first robotic arm and the base frame for the second robotic arm until the first and second robotic arms hit the same points in the space within a specified tolerance.

25. A system for calibrating a robotic system, comprising:

a processor; and a non-transitory computer readable medium comprising one or more programming instructions that when executed by the processor, cause the processor to:

obtain (1) first point cloud data comprising data points specifying tracked locations of a first tracking target coupled to a first robotic arm while the first robotic arm draws a three-dimensional object in a space, and (2) reference point cloud data comprising data points defining a reference three-dimensional object;

compare the first point cloud data to the reference point cloud data to generate first offsets; and kinematically adjusting a base frame of the first robot using the first offsets;

wherein the processor is further caused to establish a local coordinate system for the first robotic arm by:

moving the first robotic arm to various positions in the space; and tracking the first tracking target to derive where x, y and z axes lie for the first robotic arm or to understand a roll, a pitch and a yaw of the first robotic arm.

26. The system according to claim 25, wherein the base frame of the first robotic arm is kinematically adjusted by modifying the local coordinate system by defining a location of a new origin having different x, y and z coordinates or defining a new orientation for the base frame.

* * * * *